(12) United States Patent
Ishibashi

(10) Patent No.: US 7,443,535 B2
(45) Date of Patent: Oct. 28, 2008

(54) MISALIGNMENT CORRECTION PATTERN FORMATION METHOD AND MISALIGNMENT CORRECTION METHOD

(75) Inventor: Hitoshi Ishibashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 987 days.

(21) Appl. No.: 10/395,199

(22) Filed: Mar. 25, 2003

(65) Prior Publication Data

US 2003/0210412 A1 Nov. 13, 2003

(30) Foreign Application Priority Data

Mar. 25, 2002 (JP) ............... 2002-082421
Nov. 28, 2002 (JP) ............... 2002-346007

(51) Int. Cl.
*H04N 1/60* (2006.01)
*G03G 15/01* (2006.01)

(52) U.S. Cl. .................. 358/1.9; 358/3.26; 358/504; 358/540; 358/2.1; 399/301

(58) Field of Classification Search ............ 358/1.9, 358/3.26, 504, 540, 2.1, 3.06, 3.09, 3.17, 358/406, 1.12, 1.15; 347/116; 382/275, 382/159, 165, 170, 181, 151, 184, 193, 194; 353/69, 52; 399/301, 27, 28, 165, 297
See application file for complete search history.

(56) References Cited

U.S. PATENT DOCUMENTS

| 5,438,401 | A | | 8/1995 | Murayama et al. |
| 5,506,481 | A | * | 4/1996 | Wada et al. ............ 315/368.12 |
| 5,623,330 | A | | 4/1997 | Ishibashi |
| 5,630,195 | A | | 5/1997 | Sawayama et al. |
| 5,659,843 | A | | 8/1997 | Takano et al. |
| 5,761,570 | A | | 6/1998 | Sawayama et al. |
| 5,857,784 | A | * | 1/1999 | Allen ............ 400/74 |

(Continued)

FOREIGN PATENT DOCUMENTS

JP 3-174173 7/1991

(Continued)

OTHER PUBLICATIONS

U.S. Appl. No. 11/952,553, filed Dec. 7, 2007, Tomita, et al.

(Continued)

*Primary Examiner*—King Poon
*Assistant Examiner*—Steven Kau
(74) *Attorney, Agent, or Firm*—Oblon, Spivak, McClelland, Maier & Neustadt, P.C.

(57) ABSTRACT

A misalignment correction method for forming a plurality of color images on a transfer belt to form a multi-color image and correcting a misalignment of each color using a detection sensor, including forming a patch by superposing a reference pattern as a last color to be superposed on a color pattern to be corrected, preparing a plurality of patches, arranging the plurality of patches on the transfer belt, optically detecting a value of each of the patches with respect to the shift quantity of the respective patches of the continuously formed patch group in the correction pattern, calculating an intersection point of two approximate lines as output obtained on opposite sides of an inflection point of the two lines, and performing misalignment correction based on the intersection point.

11 Claims, 28 Drawing Sheets

U.S. PATENT DOCUMENTS

| | | |
|---|---|---|
| 6,148,168 A * | 11/2000 | Hirai et al. .................. 399/301 |
| 6,360,065 B1 | 3/2002 | Ishibashi et al. |
| 6,408,156 B1 * | 6/2002 | Miyazaki et al. ............ 399/301 |
| 6,470,161 B2 | 10/2002 | Fujishiro et al. |
| 6,505,022 B2 | 1/2003 | Kosuge et al. |
| 6,519,428 B1 | 2/2003 | Ohtoshi et al. |
| 6,546,219 B2 | 4/2003 | Sato et al. |
| 6,553,906 B1 | 4/2003 | Bucks et al. |
| 6,873,804 B2 | 3/2005 | Shimomura et al. |
| 6,930,786 B2 * | 8/2005 | Kataoka et al. ............ 358/1.12 |
| 2003/0210412 A1 | 11/2003 | Ishibashi |

FOREIGN PATENT DOCUMENTS

| | | |
|---|---|---|
| JP | 5-100556 | 4/1993 |
| JP | 6-1002 | 1/1994 |
| JP | 7-19084 | 3/1995 |
| JP | 9-185191 | 7/1997 |
| JP | 10-287992 | 10/1998 |
| JP | 10-329381 | 12/1998 |
| JP | 11-190920 | 7/1999 |
| JP | 2000-35704 | 2/2000 |
| JP | 2000-81745 | 3/2000 |
| JP | 2000-250286 | 9/2000 |
| JP | 2001-134041 | 5/2001 |
| JP | 2001-209223 | 8/2001 |
| JP | 2001-249513 | 9/2001 |
| JP | 2001-312115 | 11/2001 |
| JP | 2002-6580 | 1/2002 |
| JP | 2002-40746 | 2/2002 |
| JP | 2002-55572 | 2/2002 |
| JP | 2002-62707 | 2/2002 |
| JP | 3254244 | 2/2002 |
| JP | 2002-72612 | 3/2002 |
| JP | 2002-148034 | 5/2002 |
| JP | 2002-148890 | 5/2002 |
| JP | 2002-202651 | 7/2002 |
| JP | 2002-229280 | 8/2002 |

OTHER PUBLICATIONS

U.S. Appl. No. 10/395,199, Mar. 25, 2003, Ishibashi.
U.S. Appl. No. 10/798,382, Mar. 12, 2004, Ishibashi.

* cited by examiner

COLOR MISALIGNMENT CORRECTION PATTERN

COLOR MISALIGNMENT CORRECTION PATTERN

DISTANCE DEPENDENCY OF SENSOR OUTPUT

LED CURRENT DEPENDENCY OF SENSOR OUTPUT

PATTERN SCANNING DIRECTION

HALF-VALUE ANGLE : 35°

HALF-VALUE ANGLE : 45°

SHIFT QUANTITY OF COLOR LINE WITH RESPECT TO Bk LINE [dot]

IT IS ASSUMED THAT LIGHT RECEIVING PLANE IS CIRCLE (RADIUS $r = 1.5$)
LIGHT RECEIVING PLANE IS DIVIDED BY UNIT OF 1 dot ($d = 25.4/600$)

$$\cos \theta = a / r$$
$$\tan \theta = b / a$$
$$L = 2 \times b$$

$$b = a \times \tan \theta$$
$$= a \times \tan(\mathrm{acos}(a/r))$$

$$L = 2 \times b$$
$$= 2 \times [a \times \tan(\mathrm{acos}(a/r))]$$

SHIFT QUANTITY OF COLOR LINE WITH RESPECT TO BK LINE [dot]

SHIFT QUANTITY OF COLOR LINE WITH RESPECT TO Bk LINE [DOT]

DIRECTIONAL CHARACTERISTICS

HALF-VALUE ANGLE: 20°

DIRECTIONAL CHARACTERISTICS

HALF-VALUE ANGLE: 30°

PATTERN
SCANNING
DIRECTION

SECTION AA

* BY MAKING BRIGHTNESS L* NOT LARGER THAN 40, OUTPUT AT MINIMUM POINT CAN BE DECREASED, TO INCREASE THE SENSITIVITY.

PATCH A

PATCH B

PATCH A

PATCH B

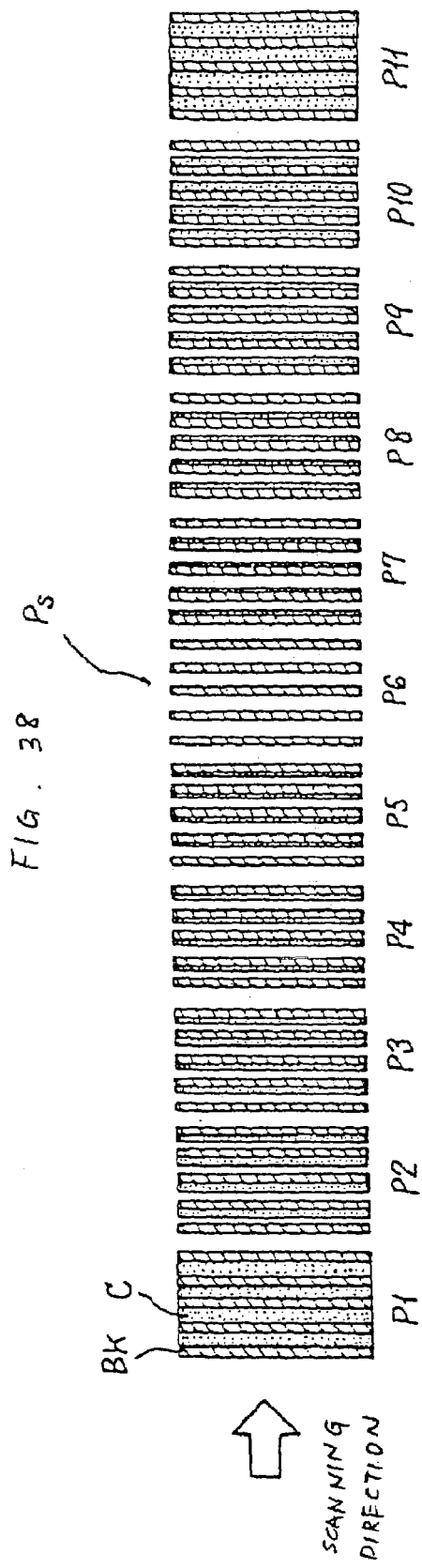

MISALIGNMENT CORRECTION PATTERN FORMATION METHOD AND MISALIGNMENT CORRECTION METHOD

BACKGROUND OF THE INVENTION

1) Field of the Invention

The present invention relates to an image formation apparatus that forms color images, such as a copying machine, a printer, a facsimile, a plotter, or an ink jet recorder, an alignment pattern detection sensor as an alignment pattern detection unit used for the image formation apparatus, a color misalignment detection method, and a color misalignment correction method.

2) Description of the Related Art

Conventionally, a predominant color image formation apparatus has been a type in which one photosensitive drum and a revolver type development apparatus are used to form toner images of respective colors, the respective toner images are transferred onto an intermediate transfer body by superposition, and then collectively transferred onto transfer paper as a sheet-form recording medium.

On the other hand, with the recent tendency of speed-up and high performance of a color image output device, a so-called four-drum tandem type color image formation apparatus has become predominant. This four-drum tandem type color image formation apparatus has a configuration such that a plurality of image formation units each including a photoreceptor (image carrier) and a development apparatus corresponding thereto are disposed for each color at positions facing a transfer belt, and that toner images on the image carriers are sequentially transferred onto transfer paper or a transfer belt.

In such a type of color image formation apparatus, the toner images formed on the image carriers for respective colors can be transferred at the same time, and therefore there is an advantage in that the printing speed can be increased, but there is a disadvantage with respect to color misalignment between the respective colors due to the method, as compared to the conventional one-drum intermediate transfer type color image formation apparatus.

As this type of technique, inventions disclosed in, for example, Japanese Patent Application Laid-Open No. 2000-81745 and Japanese Patent Application Laid-Open No. 2001-249513 are well known. These publications disclose a misalignment pattern and a detection method thereof in the four-drum tandem type color image formation apparatus.

With regard to the technical problem of the color misalignment, many correction methods are heretofore proposed. For example, in Japanese Patent Application Publication No. HEI 7-19084, a technique is disclosed in which a line image in each color is formed on a transfer belt, the passage of the line image is detected by a detection sensor, and a displacement quantity of the line image in each color from an ideal passage timing is measured, to thereby obtain a misalignment quantity in each color and perform correction.

Since such a technique is a method for detecting an edge of a pattern passing the detection sensor, the detection accuracy is determined by the sampling frequency. In other words, if a machine has a resolution of 600 dpi, and the unit of correction is 42.3 µm (=25.4/600×1000), at least the detection of ±½ (=21.7 µm) or less of the unit of correction is demanded. When the linear velocity of the line image on the transfer belt is 125 mm/sec, a minimum required sampling frequency is calculated as at least 6 kHz, from an expression of [sampling frequency]=[linear velocity]/[25.4/resolution dpi/2], but the detection accuracy (=detection error) in this case (=6 kHz) becomes 21.7 µm.

If this figure is directly fed back to the misalignment correction, there may be no problem with such a degree of sampling frequency. However, there is a case where it is necessary to use this detection result (=x µm) for other calculation. For example, when such detection is performed at left and right opposite ends with respect to the paper transport direction and skew correction is carried out or magnification error correction is carried out, based on the detection results at the opposite ends, higher detection accuracy is required. Therefore, for example, when 2 µm is required as the detection accuracy, it is necessary to increase the sampling frequency as high as 60 kHz.

As described above, since the necessary sampling frequency is in proportion to the linear velocity and resolution, high processing speed that corresponds to the high-speed sampling becomes necessary for processing blocks performed after the data sampling. Hence, there is a problem in that the cost required for color misalignment correction increases in proportion to the increase in the speed of apparatus.

As detection means for improving the detection accuracy of the pattern edge, a method of detecting the pattern edge by a Charge Coupled Device (CCD) sensor having high accuracy and high resolution is proposed, but even when such detection means is used, problems such as complication and cost increase of the apparatus cannot be avoided.

In order to deal with these problems, for example, in Japanese Patent No. 3254244, a technique as follows is disclosed. Each average density of a toner image pattern formed by superposing a second color toner image on a first color toner image and of a toner image pattern formed by shifting the relative position of the two color patterns by a predetermined quantity, is detected by an optical sensor, and the misalignment quantity between the first color and the second color and the direction of the misalignment are determined from the signal output of the optical sensor, to correct the misalignment.

In this technique, the detection of the misalignment quantity is performed not by detecting the edge of the pattern image (line image), but by detecting an averaged output signal of the optical sensor detected from the whole pattern. Therefore, it is possible to detect the misalignment quantity by a sampling frequency as low as 500 Hz or below (for every 2 msec), that is, about 1/100 as compared with the one disclosed in Japanese Patent Application Publication No. HEI 7-19084.

Therefore, when the misalignment detection method disclosed in Japanese Patent No. 3254244 is used, the hardware can be configured at a lower cost relating to the misalignment quantity detection if a detection accuracy of the same level as with the technique disclosed in Japanese Patent Application Publication No. HEI 7-19084 can be obtained, and hence considerable cost reduction becomes possible.

The technique similar to the misalignment detection method described in Japanese Patent No. 3254244 includes techniques disclosed, for example, in Japanese Patent Application Laid-Open ("JPA") No. HEI 10-329381, JPA No. 2000-81745, JPA No. 2001-209223, JPA No. 2002-40746, and JPA No. 2002-229280.

If it is considered to perform misalignment correction based on the output signal from the optical sensor with respect to a superposed pattern of two color toner images, described in Japanese Patent No. 3254244, and if it is assumed that the maximum correction quantity to be corrected is ±10 dots, then the misalignment correction quantity and the direction thereof can be determined by forming 21 patterns obtained through shifting the relative position of the two colors dot by dot and reading extreme values of the patterns.

However, by creating patterns as many as 21, not only wasteful toner consumption increases, but also the time required for automatic misalignment adjustment increases, which is not desirable.

Relating to this problem, for example, JPA No. HEI 10-329381 discloses a method for detecting misalignment quantity more accurately, by calculating an intersection point of two lines, when the reflected optical density is plotted on the longitudinal axis, with respect to a printing position parameter plotted on the lateral axis.

With respect to the technical problem of the color misalignment, various color misalignment correction methods are heretofore proposed. One of these is a correction method in which a plurality of line images of the respective colors is formed on a transfer belt, and the color misalignment is corrected from the absolute position of the line image. When such a method that the color misalignment quantity of the respective color line images with respect to a reference color line is detected to correct this is chosen, a method in which a line edge is detected from an output of reflected light of the light irradiated to the line is taken as a specific method. In this method, however, the sampling frequency must be increased (corresponding to speed-up of the apparatus), in order to improve the edge detection accuracy, and in addition to this, high processing speed becomes necessary. Therefore, there is a problem in that the cost required for color misalignment correction increases in proportion to speed-up of the apparatus.

Particularly, in order to improve the edge detection accuracy, a method for detecting the edge by a CCD sensor having high accuracy and high resolution is proposed. However, even when such a method is used, there are technical problems such as complication and cost increase of the apparatus.

Therefore, Japanese Patent Application Laid-Open No. 2001-249513 discloses a method in which after a reference color having different pattern pitch and a measurement color to be corrected are formed by superposition, a change in quantity of light corresponding to one cycle of the superposed color pattern is detected, without detecting the line edge, and color misalignment between these is detected based on the detection information and corrected. When such a method is used, a displacement in the direction of reading the line (that is, a displacement in the vertical scanning direction) and a displacement in the horizontal scanning direction (that is, skew) can be detected, but it is considered that correction with respect to the displacement in the horizontal scanning direction is difficult, and no specific method relating to this is specified.

On the other hand, Japanese Patent Application Laid-Open No. 2000-81745 discloses a method in which a reference color and a color to be corrected in a pattern comprising a plurality of lines having the same width and a line interval equal thereto are superposed, and a density detection value of the superposed pattern is compared with a density value $D0$ under an ideal condition when the pattern images are exactly superposed on each other, to thereby correct the color misalignment.

According to this method, it is indicated that the displacement quantity in the horizontal scanning direction and the vertical scanning direction can be detected by forming such a single patch. Actually, however, the difference between the reference density $D0$ and the detected value largely changes due to the toner density of the respective colors, the light emission current of an Light Emitting Diode (LED), being a detection sensor, and the detection distance of the sensor (distance from an object to be measured to the sensor), and even if the pattern is formed only by the reference color, in order to correct the value of density $D0$ of the reference pattern (a pattern formed by superposing the reference color and the color to be corrected) by the toner density value at that time, since the total thickness of the toner is different between this pattern and the reference pattern density $D0$, the both do not become equal, thereby causing a detection error in the color misalignment correction quantity.

According to the method disclosed in Japanese Patent Application Laid-Open No. HEI 10-329381, even if the maximum correction quantity is ±10 dots, it is not necessary to form 21 patterns, and 11 patterns shifted by several dots appropriately, for example by 2 dots, need only be formed. If the patterns are shifted by 5 dots, then only five patterns are required. As a result, highly accurate misalignment correction can be realized, while considerably reducing the number of patterns and the time required for misalignment adjustment.

Since misalignment adjustment is an operation that has no relation to the normal printing operation, if the processing time is long, the time required for the first print increases. Therefore, the shorter such adjustment time, the better, in view of the productivity.

However, when the misalignment quantity is obtained by calculating an intersection point of a linear approximate expression of two lines, such an output characteristic must be obtained that a sensor output signal of each patch linearly increases or decreases with respect to a predetermined optional shift quantity, that is, a line in which a coefficient of determination $R2$ in each approximate expression of two lines is infinitely close to 1 must be obtained.

Therefore, for example in a color image formation apparatus of four-drum tandem direct transfer method (a method in which transfer paper is electrostatically attracted onto a transfer belt 18, and images in the respective colors are sequentially transferred onto the transfer paper and superposed) as shown in FIG. 1, an experiment is carried out in the following manner. That is, as shown in FIG. 45, each color line in a patch configured by superposing two color lines of black (Bk), being a reference color, and another color (for example, cyan (c)) is formed by superposition of one line, being the minimum number, is designated as one patch. A detection pattern (alignment pattern) Pk for misalignment detection in the horizontal scanning direction obtained by continuously forming 13 patches (P1 to P13) with the relative position of the two colors shifted by an optional quantity is read by a conventional optical sensor (alignment pattern detection sensor) as shown in FIGS. 46A and 46B, and an output voltage of each patch with respect to the optional shift quantity of the line other than the reference color is plotted.

In FIG. 45, the respective patches are arranged along the scanning direction of the optical sensor, that is, the movement direction of the transfer belt, and the color other than the reference color is shifted by an optional quantity, in a direction orthogonal to the direction, in order to detect color misalignment in the horizontal scanning direction.

In FIGS. 46A and 46B, the optical sensor comprises a Light Emitting Diode (LED) 700, a regular reflected light photoreceptor 701, and a diffused light (hereinafter also referred to as diffused reflected light) photoreceptor 702, and these elements are supported on a support base 703. These elements are actually arranged in a substantially vertical plane with respect to a moving plane of an alignment pattern, but in FIG. 46A, it is displayed on a plane by bringing it down by 90 degrees for easy understanding. In FIG. 46B, reference sign 700a denotes a spot shape of the LED 700, and reference sign

701a denotes a spot shape of the regular reflected light photoreceptor 701, and reference sign 702a denotes a spot shape of the diffused light photoreceptor 702.

As a result of experiments, as shown in FIG. 47, in the approximate line obtained by plotted points on the negative side with respect to the extreme value, R2 is 0.9275. On the other hand, in the approximate line obtained by plotted points on the positive side with respect to the extreme value, R2 is 0.9555. Thus, an output characteristic that cannot be said as a straight line has been obtained.

As a result of calculation of an intersection point by the two approximate lines, the misalignment quantity of 34.74 μm (=0.82 dot) is obtained. The experiment conditions of the detection pattern and the detection sensor are as follows.

Detection Pattern: (=detailed parameter of a pattern shown in FIG. 45)
  Bk line width: 24 dots (=1.016 mm)
  Color line width: 24 dots (=1.016 mm)
  Optional shift quantity: 4 dots (=25.4/600×1000×4=169.3 μm)
  Total number of patches: 13 patches (in P1 and P13, the both are not superposed completely, and in P7, the both are completely superposed)

Detection Sensor: (=detailed specification of a sensor shown in FIGS. 46A and 46B)
  Element on light emission side: GaAs infrared light emission diode (peak emission wavelength, λS=950 nm); top view type spot diameter: 1.0 mm; element on photoreceptor side: Si phototransistor (peak spectral sensitivity, λS=800 nm); top view type spot diameter: regular reflected light receiving side, 1.0 mm; diffused reflected light receiving side, 3.0 mm; Detection distance: 5 mm (distance from upper part of the sensor to an object surface to be detected (patch))

Linear Velocity:
  245 mm/sec [sampling frequency]
  500 Sampling/sec

SUMMARY OF THE INVENTION

The present invention has been achieved in order to solve the above problems of a method for correcting the color misalignment quantity by the density of a solid image, or a density detection value of a patch image formed by superposing the line images on each other. It is an object of this invention to provide a method of forming a misalignment correction pattern, enabling detection of color misalignment highly accurately, by a simple configuration, while suppressing a cost increase of the apparatus.

It is another object of the present invention to provide a misalignment correction method for correcting misalignment highly accurately, based on a result of highly accurate misalignment detection.

It is still another other object of the present invention to provide a color image formation apparatus that can form the correction pattern and that can carry out highly accurate misalignment correction.

It is therefore a main object of the present invention to provide an alignment pattern detection sensor as an alignment pattern detection unit that can detect color misalignment highly accurately by a simple configuration and at a low cost, an image formation apparatus using the same, a color misalignment detection method, and a color misalignment correction method.

The misalignment correction pattern formation method of forming a plurality of color images on a transfer belt to form a multi-color Image and correcting misalignment of each color using a detection sensor, according to one aspect of this invention, comprises preparing a reference pattern with a plurality of lines formed by a black color as a reference color at a predetermined pitch between the lines, and preparing a color pattern to be corrected with a plurality of lines formed by a color toner at an equal pitch to the pitch in the reference pattern. The method also comprises forming a pattern as a patch by superposing the reference pattern as a last color to be superposed on the color pattern, and preparing a plurality of patches each in which a position of the lines in the color pattern with respect to the lines in the reference pattern is shifted by an optional quantity in a pitch direction of the lines. The method further comprises arranging the plurality of patches on the transfer belt along a movement direction thereof, and selecting either one of a patch in which the color pattern to be corrected is completely superposed by the reference pattern and a patch in which the color pattern to be corrected is completely displaced from the reference pattern, the selected patch being set as a reference patch. The method further comprises forming a continuously formed patch group including the reference patch and the patches as a misalignment correction pattern.

The misalignment correction method of forming a plurality of color images on a transfer belt to form a multi-color image and correcting misalignment of each color using a detection sensor, according to another aspect of this invention, comprises preparing a reference pattern with a plurality of lines formed by a black color as a reference color at a predetermined pitch between the lines, and preparing a color pattern to be corrected with a plurality of lines formed by a color toner at an equal pitch to the pitch in the reference pattern. The method also comprises forming a pattern as a patch by superposing the reference pattern as a last color to be superposed on the color pattern, and preparing a plurality of patches each in which a position of the lines in the color pattern with respect to the lines in the reference pattern is shifted by an optional quantity in a pitch direction of the lines. The method further comprises arranging the plurality of patches on the transfer belt along a movement direction thereof, selecting either one of a patch in which the color pattern to be corrected is completely superposed by the reference pattern and a patch in which the color pattern to be corrected is completely displaced from the reference pattern, the selected patch being set as a reference patch. The method further comprises forming a continuously formed patch group including the reference patch and the patches as a correction pattern, optically detecting a value of each of the patches with respect to an optional shift quantity of the respective patches of the continuously formed patch group in the correction pattern. The method further comprises calculating an intersection point of two approximate lines as output obtained on opposite sides of an inflection point of the two lines by using the detected values excluding a minimum value and a maximum value, and performing misalignment correction based on the intersection point.

The image formation apparatus according to still another aspect of this invention, comprises a plurality of image carriers, and a transfer belt on which toner images formed on the image carriers are sequentially transferred. The apparatus also comprises a pattern formation unit that prepares a reference pattern with a plurality of lines formed by a black color as a reference color at a predetermined pitch between the lines, that prepares a color pattern to be corrected with a plurality of lines formed by a color toner at an equal pitch to the pitch in the reference pattern, that forms a pattern as a patch by superposing the reference pattern as a last color to be superposed on the color pattern, that prepares a plurality of patches each in which a position of the lines in the color pattern with respect to the lines in the reference pattern is shifted by an optional quantity in a pitch direction of the lines, that arranges the plurality of patches on the transfer belt along a movement direction thereof, that selects either one of a patch in which the color pattern to be corrected is completely superposed by the reference pattern and a patch in which the color pattern to be corrected is completely displaced from the reference pattern, the selected patch being set as a reference patch, and that forms a continuously formed patch group including the reference patch and the patches as a correction pattern. The apparatus further comprises a detection sensor that detects diffused light output components of the continuously formed patch group.

The alignment pattern detection sensor according to still another aspect of this invention, comprises a light emitting unit that is arranged along a movement direction of an alignment pattern, the alignment pattern being formed by superposing an image of a reference color on an image of a color other than the reference color, and emits light to the alignment pattern that moves. The sensor also comprises a light receiver that has a light receiving plane receiving reflected light from the moving alignment pattern, is arranged along the movement direction of the alignment pattern, and sets a spot shape formed by the reflected light on the light receiving plane to a shape such that an increase in a light receiving area of the color other than the reference color on the light receiving plane becomes constant, the increase corresponding to a shift quantity of the color with respect to the reference color at a different position of the alignment pattern. Either one of a diffused reflected light and a diffused reflected component is detected from the alignment pattern.

The image formation apparatus according to still another aspect of this invention, comprises a plurality of image carriers, and a transfer body on which toner images formed on the image carriers are sequentially and superposedly transferred to form a superposed image, and that collectively transfers the superposed image onto a sheet-form recording medium. The apparatus also comprises an alignment pattern detection unit including a light emitting unit and a light receiver. The light emitting unit is arranged along a movement direction of an alignment pattern, the alignment pattern being formed by superposing an image of a reference color on an image of a color other than the reference color and being transferred onto the transfer body, and that emits light to the alignment pattern that moves. The light receiver has a light receiving plane receiving reflected light from the moving alignment pattern, is arranged along the movement direction of the alignment pattern, and sets a spot shape formed by the reflected light on the light receiving plane to a shape such that an increase in a light receiving area of the color other than the reference color on the light receiving plane becomes constant, the increase corresponding to a shift quantity of the color with respect to the reference color at a different position of the alignment pattern. The alignment pattern detection unit detects either one of a diffused reflected light and a diffused reflected component from the alignment pattern. The apparatus further comprises a misalignment quantity correction unit that determines a misalignment quantity between the reference color image and the color image and a direction of the misalignment based on an output signal from the alignment pattern detection unit, and corrects the misalignment quantity.

The image formation apparatus according to still another aspect of this invention, comprises a plurality of image carriers, and a transfer body that carries a sheet-form recording medium and transfers toner images formed on the image carriers sequentially and superposedly onto the sheet-form recording medium. The apparatus also comprises an alignment pattern detection unit including a light emitting unit and a light receiver. The light emitting unit is arranged along a movement direction of an alignment pattern, the alignment pattern being formed by superposing an image of a reference color on an image of a color other than the reference color and being transferred on the transfer body, and that emits light to the alignment pattern that moves. The light receiver has a light receiving plane receiving reflected light from the moving alignment pattern, is arranged along the movement direction of the alignment pattern, and sets a spot shape formed by the reflected light on the light receiving plane to a shape such that an increase in a light receiving area of the color other than the reference color on the light receiving plane becomes constant, the increase corresponding to a shift quantity of the color with respect to the reference color at a different position of the alignment pattern. The alignment pattern detection unit detects either one of a diffused reflected light and a diffused reflected component from the alignment pattern. The apparatus further comprises a misalignment quantity correction unit that determines a misalignment quantity between the reference color image and the color image and a direction of the misalignment based on an output signal from the alignment pattern detection unit, and corrects the misalignment quantity.

The image formation apparatus according to still another aspect of this invention, obtains a color image by an ink jet method. The apparatus comprises an alignment pattern detection unit including a light emitting unit and a light receiver. The light emitting unit is arranged along a movement direction of an alignment pattern, the alignment pattern being formed by superposing an image of a reference color on an image of a color other than the reference color, and the light emitting unit emits light to the alignment pattern that moves. The light receiver has a light receiving plane receiving reflected light from the moving alignment pattern, is arranged along the movement direction of the alignment pattern, and sets a spot shape formed by the reflected light on the light receiving plane to a shape such that an increase in a light receiving area of the color other than the reference color on the light receiving plane becomes constant, the increase corresponding to a shift quantity of the color with respect to the reference color at a different position of the alignment pattern. The alignment pattern detection unit detects either one of a diffused reflected light and a diffused reflected component from the alignment pattern. The apparatus also comprises a misalignment quantity correction unit that determines a misalignment quantity between the reference color image and the color image and a direction of the misalignment based on an output signal from the alignment pattern detection unit, and corrects the misalignment quantity.

The color misalignment detection method according to still another aspect of this invention, comprises emitting light to a moving alignment pattern formed by superposing an image of a reference color on an image of a color other than the reference color, and setting a spot shape formed by a reflected light on a light receiving plane for receiving the reflected light from the moving alignment pattern to a shape such that an increase in a light receiving area of the color other than the reference color in the light receiving plane becomes constant, the increase corresponding to a shift quantity of the color with respect to the reference color at a different position of the alignment pattern. The method also comprises detecting either one of a diffused reflected light and a diffused reflected component from the alignment pattern, and determining a misalignment quantity between the reference color image and the image of the color other than the reference color and a direction of the misalignment based on an output signal according to either one of the detected diffused reflected light and diffused reflected component.

The color misalignment correction method according to still another aspect of this invention, comprises calculating an intersection point of two lines formed on opposite sides of an extreme value in an output signal by a misalignment quantity correction unit based on an output signal from an alignment pattern detection unit, the output signal corresponding to an optional shift quantity of a line image of a color other than a reference color with respect to the reference color line image in the alignment pattern. The method also comprises excluding the extreme value and a data point near the extreme value when the intersection point is calculated, determining a misalignment quantity of the color other than the reference color with respect to the reference color and a direction of the misalignment, and correcting the misalignment.

The color misalignment correction method according to still another aspect of this invention, comprises calculating an intersection point of two lines formed on opposite sides of an extreme value of an output signal by a misalignment quantity correction unit based on the output signal detected from a detection unit that includes a light emitting unit and a light receiver. The light emitting unit emits light to an alignment pattern for receiving reflected light from the alignment pattern, the alignment pattern having a reference line image and a line image of a color other than a color of the reference line image, lines in the color line image being shifted with respect to lines in the reference line image by an optional shift quantity. The light receiver receives a reflected light from the alignment pattern. The detection unit detects an optional shift quantity of the line image of the color other than the reference color. The method also comprises determining a misalignment quantity of the color other than the reference color with respect to the reference color and a direction of the misalignment, and correcting the misalignment. The light emitting unit and the light receiver are arranged so as to correct nonlinearity of the two lines.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 38 is a schematic plan view of an alignment pattern for misalignment detection in the vertical scanning direction;

DETAILED DESCRIPTION

Embodiments of the present invention will be explained below with reference to the accompanying drawings.

A first embodiment will be explained below based on FIG. 1 to FIG. 9.

Figure 1:
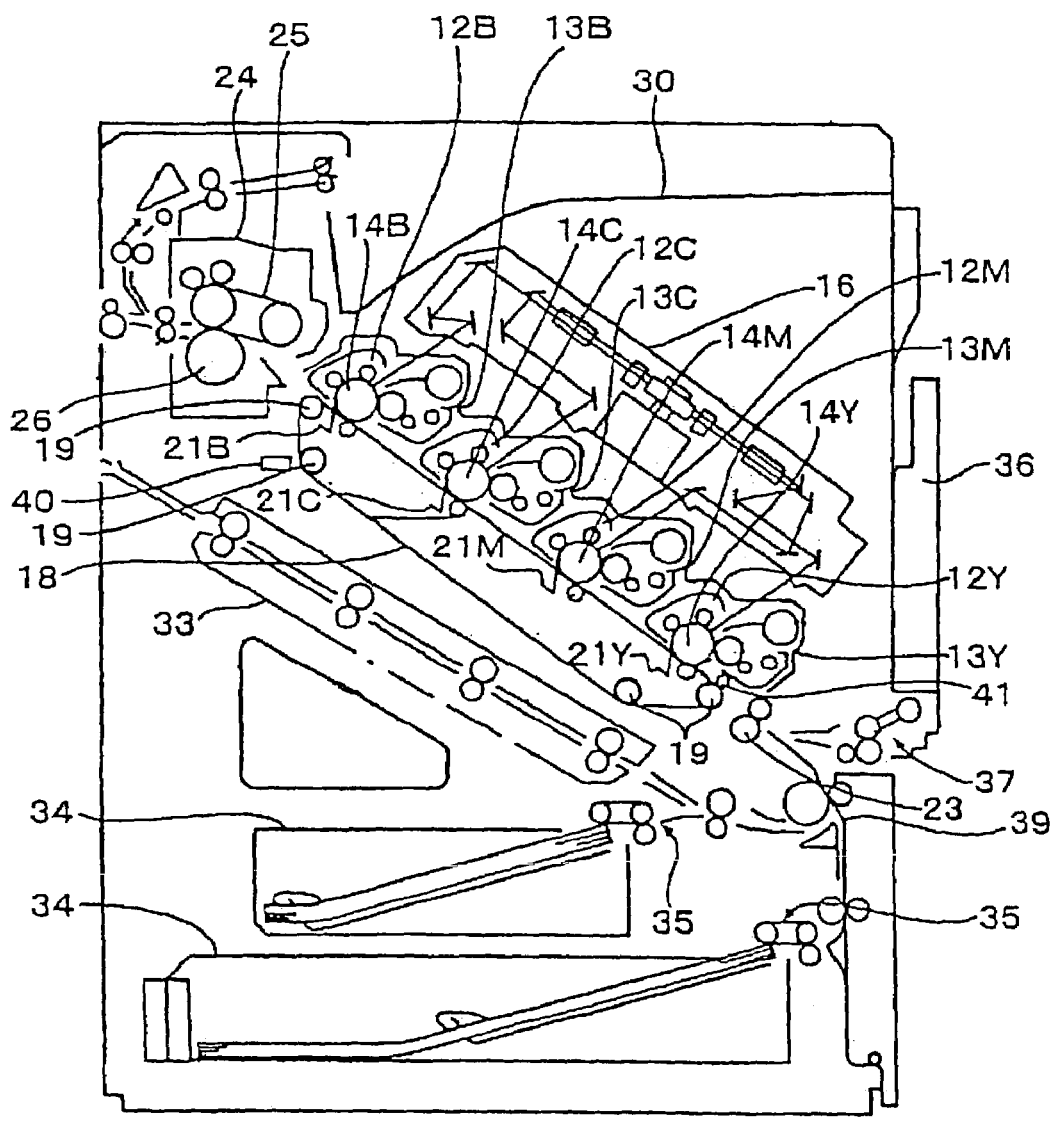
FIG. 1 is a schematic block diagram of a color image formation apparatus according to a first embodiment of the present invention.

At first, the schematic configuration of a color printer of four-drum tandem direct transfer method as an image formation apparatus in this embodiment is explained based on FIG. 1.

The color printer has three paper feed trays, that is, one manual feed tray 36 and two paper feed cassettes 34 (first paper feed tray, and second paper feed tray), wherein transfer paper (not shown) as a sheet-form recording medium fed by the manual feed tray 36 is separated one by one sequentially from the upper most sheet by a feed roller 37, and carried toward a resist roller pair 23. The transfer paper fed from the first paper feed tray 34 or the second paper feed tray 34 is separated one by one sequentially from the upper most sheet by a feed roller 35, and carried toward the resist roller pair 23 via a carrier roller pair 39.

The fed transfer paper is once stopped by the resist roller pair 23, and skew is corrected. Thereafter, the transfer paper is carried toward a transfer belt 18 by a rotation operation of the resist roller pair 23 by ON control of a resist clutch (not shown), at a timing when the tip of an image formed on a photosensitive drum 14Y located on the uppermost stream, described later, and a predetermined position of the transfer paper in a transport direction coincide with each other.

When the transfer paper passes a paper attraction nip composed of the transfer belt 18 and a paper attraction roller 41, the transfer paper is electrostatically attracted to the transfer belt 18 by a bias applied to the paper attraction roller 41, and carried at a linear velocity of 125 mm/sec.

Transfer bias (positive) having a polarity opposite to the charging polarity (negative) of the toner is applied on transfer brushes 21B, 21C, 21M, and 21Y arranged at positions facing the photosensitive drums 14B, 14C, 14M, and 14Y of the respective colors, with the transfer belt 18 put therebetween, thereby toner images in the respective colors formed on the respective photosensitive drums 14B, 14C, 14M, and 14Y are transferred onto the transfer paper attracted to the transfer belt 18, in order of Yellow (Y), Magenta (M), Cyan (C), and Black (Bk).

The transfer paper having passed through the transfer step in the respective colors is self stripper from the transfer belt 18 at a portion of a downstream drive roller 19, and carried to a fixing apparatus 24. By passing through the fixing nip composed of a fixing belt 25 and a pressure roller 26 in the fixing apparatus 24, the tone, image is transferred onto the transfer paper by heat and pressure. The transfer paper after fixation is ejected to a Face Down (FD) tray 30 formed on the upper face of the apparatus body, in a single side printing mode.

When a double side printing mode is selected in advance, the transfer paper coming out from the fixing apparatus 24 is carried to a reversing unit (not shown), and carried to a reversing carrier unit 33 located below the transfer unit, with the opposite sides thereof reversed by the reversing unit. The transfer paper is re-fed from the reversing carrier unit 33, and carried to the resist roller pair 23 via the carrier roller pair 39. Thereafter, through the similar operation to that in the single side printing mode, the transfer paper passes the fixing apparatus 24 and is ejected to the FD tray 30.

The configuration and the operation in the image formation section of the color printer are explained below in detail.

The image formation section has the similar configuration and operation in the respective colors. Therefore, the configuration and operation for forming a yellow image is explained representatively, and for the other images, reference sign corresponding to the respective colors is given, and the explanation thereof is omitted.

An image formation unit 12Y that has a charging roller 42Y and a cleaning unit 43Y, a developing unit 13Y, and an optical write unit 16 are provided around the photosensitive drum 14Y located on the most upstream side in the transfer paper transport direction.

At the time of image forming, the photosensitive drum 14Y is rotated in the clockwise direction by a main motor (not shown), and static-eliminated by Alternate Current (AC) bias (having no Direct Current (DC) component) applied to the charging roller 42Y, so that the surface potential becomes a reference potential of about −50 v.

The photosensitive drum 14Y is uniformly charged to a potential substantially equal to the DC component, by applying the DC bias, on which the AC bias is superposed, to the charging roller 42Y, and the surface potential thereof is charged substantially to −500 v to −700 v (the target charged potential is determined by a process controller).

The digital image information sent from a controller (not shown) as a print image is converted to a binary LD light emission signal for each color, so that exposure light 16Y is irradiated onto the photosensitive drum 14Y by the optical write unit 16 that has a cylinder lens, a polygon motor, an fθ lens, first to third mirrors, a WTL lens, and the like.

The drum surface potential on the irradiated portion becomes substantially −50 v, and an electrostatic latent image corresponding to the image information is formed at a write density (=resolution) of 600 dpi.

The electrostatic latent image corresponding to the yellow image information on the photosensitive drum 14Y is visualized by the developing unit 13Y. DC (−300 to −500 v) on which AC bias is superposed is applied to a developing sleeve 44Y in the developing unit 13Y, thereby the toner (Q/M, −20 to −30 μC/g) is developed only on the image portion where the potential has dropped due to writing, and the toner image is formed. The developing unit 13Y is a developing unit using a so-called two-component type development method, in which a mixed developer of carrier and toner are contained.

The toner image formed on the photosensitive drums 14B, 14C, 14M, and 14Y for respective colors is transferred onto the transfer paper attracted on the transfer belt 18, by the transfer bias.

The toner image formed on the photosensitive drums for respective colors are carried by the resist roller 23, and transferred onto the transfer paper attracted on the transfer belt 18 by passing the nip of the paper attraction roller 41, by a bias (transfer bias) having a polarity opposite to the charging polarity of the toner, applied to the transfer brushes 21B, 21C, 21M, and 21Y arranged at positions facing the photoreceptor, with the transfer belt therebetween.

In the image formation apparatus of the present invention, prior to such image forming operation, color misalignment adjusting operation is performed.

Figure 2:
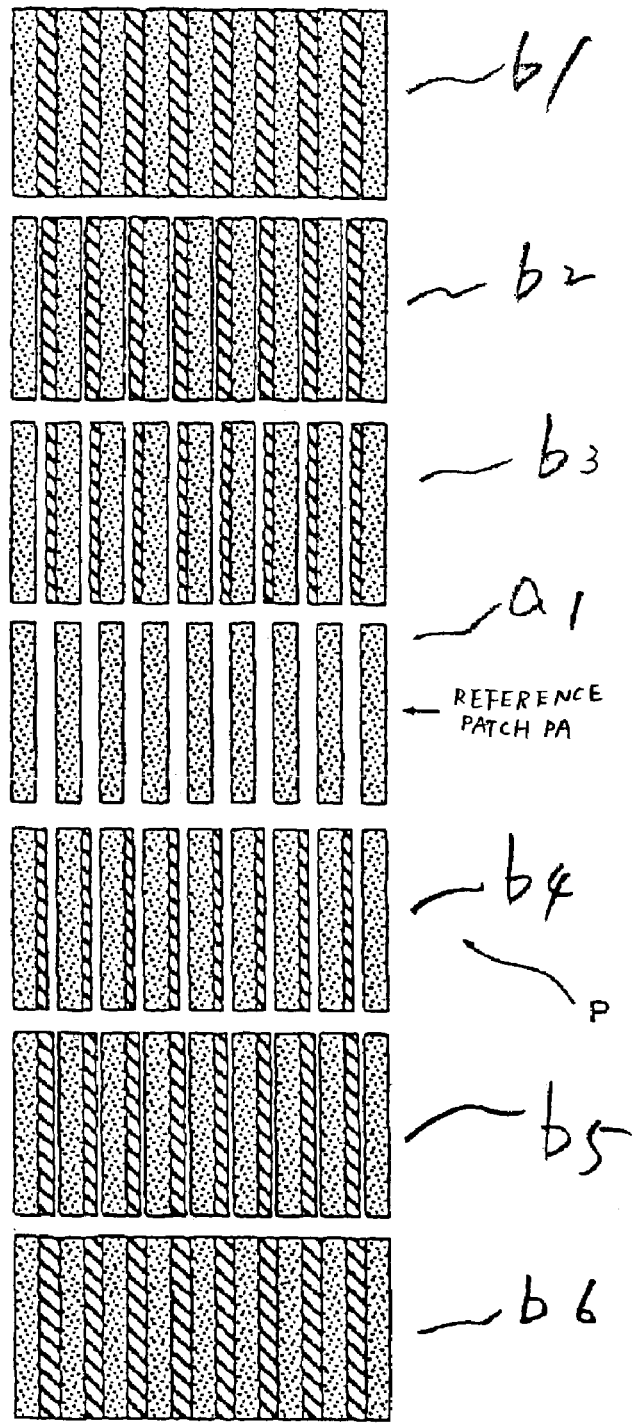
FIG. 2 is a color misalignment correction pattern in the horizontal scanning direction formed on a transfer belt.

Here, the color misalignment detection sensor for detecting color misalignment is denoted by reference sign 40 in FIG. 1, wherein a color misalignment patch group P (FIG. 2) imaged on the transfer belt is read by this sensor, and calculation processing is carried out from the read output value, to execute color misalignment correction. The execution timing thereof is specifically at the time of power ON, or when a temperature increase of the optical system becomes a predetermined value or higher. FIG. 2 shows a color misalignment pattern.

Figure 7:
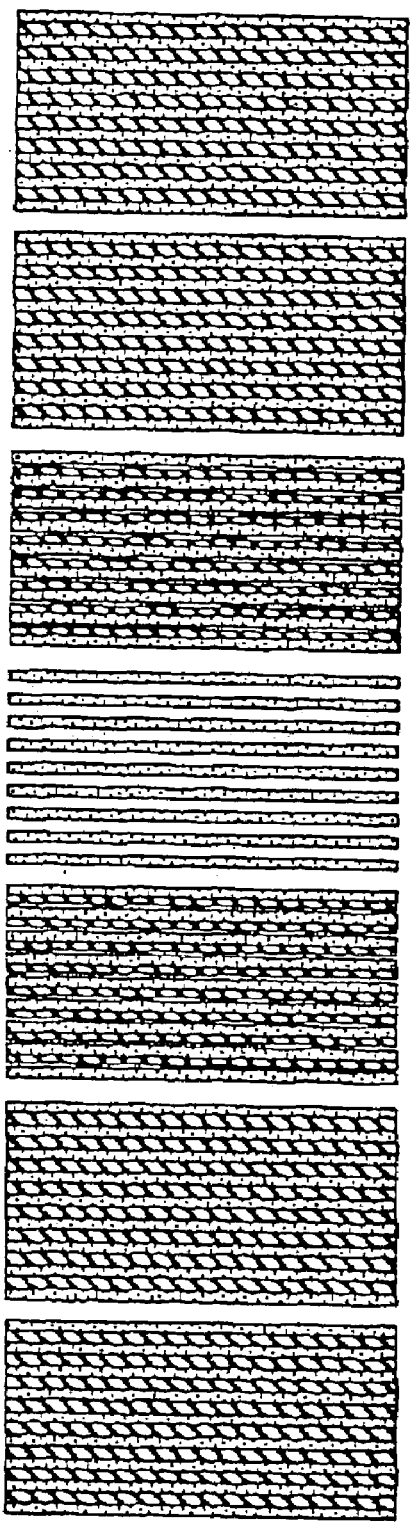
FIG. 7 is a color misalignment correction pattern in the vertical scanning direction formed on a transfer belt.

The one shown in FIG. 2 is a color misalignment correction pattern in the horizontal scanning direction, and as a color misalignment correction pattern in the vertical scanning direction, a correction pattern in which the patch group is arranged vertically as shown in FIG. 7 can be used.

The operation principle in color misalignment detection according to the present invention is explained below.

Figure 3:
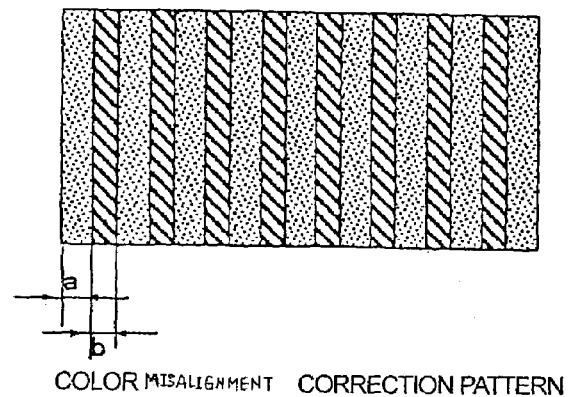
FIG. 3 shows details of the color misalignment detection pattern formed on the transfer belt.

One patch in the color misalignment detection patch group according to the present invention has a configuration, as shown in FIG. 3, such that Bk toner, being a reference color, is superposed on a pattern in which a plurality of color toners (C, M, Y) to be corrected are formed with a predetermined line width (a) and a line interval (b) (=a) equal thereto, with the equal line width (a) and the equal line interval (b).

With respect to this patch, a patch in which the both colors are completely superposed as shown in FIG. 2 is designated as a reference patch PA, and a plurality of continuous patch groups are formed, in which the relative position thereof is shifted by an optional quantity parallel with the line forming direction, on the near side of the read direction of the sensor, and a plurality of continuous patch groups are formed, in which the relative position thereof is shifted by an optional quantity in the opposite direction, on the far side of the read direction of the sensor, with respect to the reference patch, and these patch groups P is referred to as a color misalignment correction pattern.

When such a correction pattern is read by a diffused light output of a reflection type photo sensor, in the reference patch, the diffused light from the transfer belt, being the ground of this patch, and the diffused light from a plurality of the black line portions are combined and output. Since the transfer belt 18 has good surface properties, the diffused light output is small. Further, in the black line portion, since the light is absorbed, the combined output becomes very small. The relation between each patch length (patch width), being the length of the detection sensor in the read direction, the patch interval, and the spot diameter of the detection sensor on the transfer body herein is assumed such that, $$\text{patch length} + \text{patch interval} > \text{spot diameter of sensor on transfer body} \times 2.$$

When any color (this may be Bk, being the reference color, or a color to be corrected) is shifted by an optional quantity with respect to the reference patch PA, a predetermined diffused light output is returned from the color toner, being the color to be corrected. Therefore, the diffused light output value obtained by the patch group P in which the color to be corrected is gradually shifted by an optional quantity increases corresponding to the shift quantity. Further, when a patch shifted on the opposite side by an optional quantity with respect to the reference patch PA is taken into consideration, the similar output value can be obtained. Therefore, when this detection value is plotted with respect to the optional shift quantity set in advance, the output result as shown in FIG. 4 can be obtained.

In other words, this uses the fact that the relation of, output from black toner≦output from transfer belt<output from color toner is established, with respect to the diffused light output from the ground of the transfer belt 18, the block toner, and the color toner.

Figure 4:
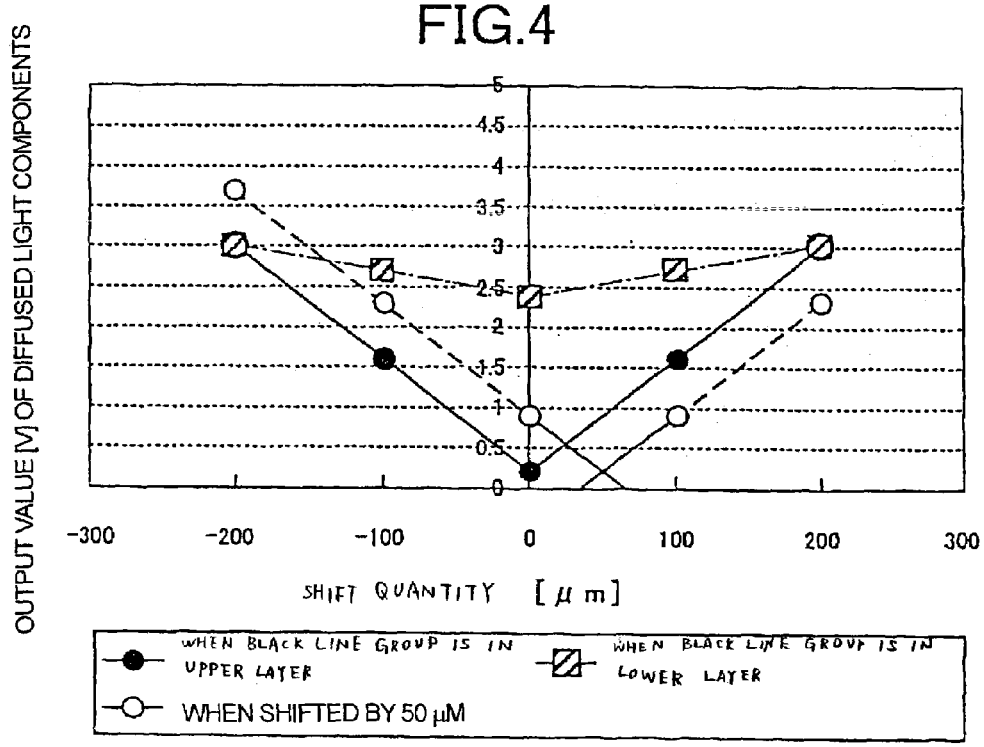
FIG. 4 shows detection output from a patch group, when being shifted by 50 μm, and when a black line is located on an upper layer and a lower layer.

Therefore, in the opposite case, that is, when a configuration in which a line pattern of a color toner is superposed on a line pattern of the black toner, being the reference color, is considered, a difference between a diffused light output value from a patch in which the both colors are completely superposed, and a diffused light output value from a patch in which the both colors are not completely superposed becomes very small as shown in FIG. 4, due to the relation of "output from black toner≦output from transfer belt".

When color misalignment is detected and corrected by the color misalignment correction pattern, it is desired that the black toner be on the upper side. Therefore, it is desired that the image forming station of the black toner be on the most downstream side, taking into consideration the relation of image forming sequence of the respective color toner images on the transfer belt 18. Further, when the transfer belt 18 itself is made black, using a difference in the reflectance established between the diffused light output values from the transfer belt 18, the black toner, and the color toner, relation of "output from black toner≅output from transfer belt" is obtained, and hence higher output difference can be obtained, thereby enabling highly accurate color misalignment detection.

From above, in this embodiment, the Bk image formation unit is arranged on the most downstream side of the transfer carrier belt 18, and a black polyimide belt is used as the transfer belt 18.

A method for calculating the color misalignment quantity from the output value from such a pattern is as described below.

In the ideal state in which no color misalignment occurs, the output becomes a minimum value in the reference patch PA as shown in FIG. 4, and hence by obtaining a value of lateral axis, being an intersection point of two line segments on the opposite sides of the minimum value in the output, the displacement quantity can be calculated. In other words, from simultaneous linear equations, $y=ax+b$, and $y=cx+d$, $x=(d-b)/(a-c)$ can be calculated.

When a color misalignment has occurred, the output value of each patch changes corresponding to the color misalignment quantity. Therefore, if an intersection point of two line segments obtained from the respective output values is determined, the color misalignment quantity can be calculated in the same manner.

In FIG. 4, a calculation of the color misalignment quantity is shown, when it is assumed that the shift quantity of each patch is 100 μm, and the displacement quantity is 50 μm. Therefore, since the minimum output value is a point at 0 μm and 100 μm on the lateral axis, there is no problem even if all data is used as the calculation value. But if the displacement quantity is 75 μm, processing for determining for which calculation of the two line segments the minimum value should be used becomes necessary, and hence it is desired to exclude the minimum value (or the maximum value) from the calculation.

From the color misalignment correction principle of the color misalignment pattern and the calculation unit, in this embodiment, 10 patches are formed such that the respective line width is 0.5 mm, the line interval is 0.5 mm, the shift quantity of the respective patch is 100 μm, and the size of one patch is 12 mm×12 mm, to detect the color misalignment quantity.

Figure 5:
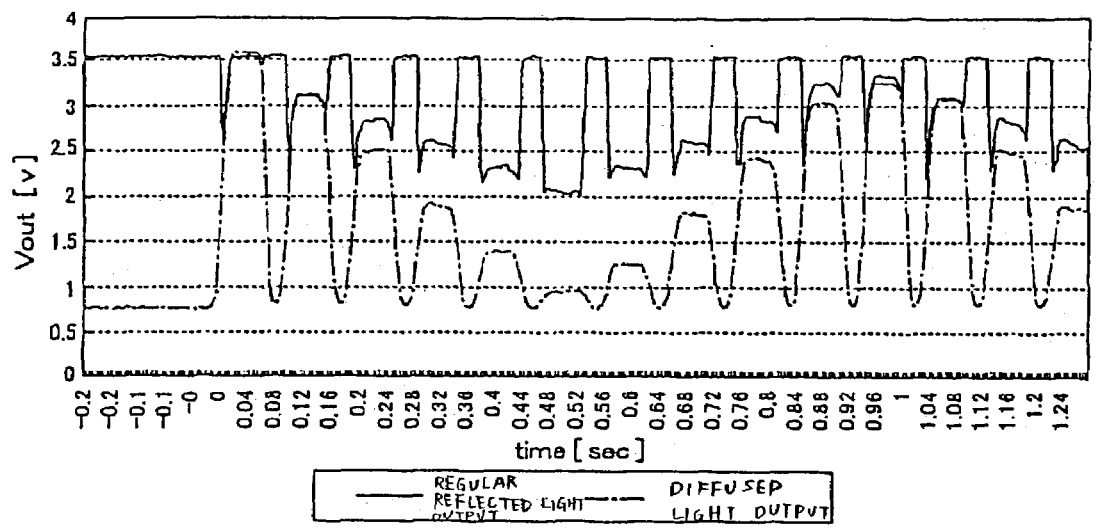
FIG. 5 shows a sensor output waveform when the color misalignment quantity is detected, by setting the respective line width of the correction pattern to 0.5 mm, the line interval to 0.5 mm, and the shift quantity of the respective patches to 100 μm, and by forming 10 patches, each patch having a size of 12 mm×12 mm.
Figure 6:
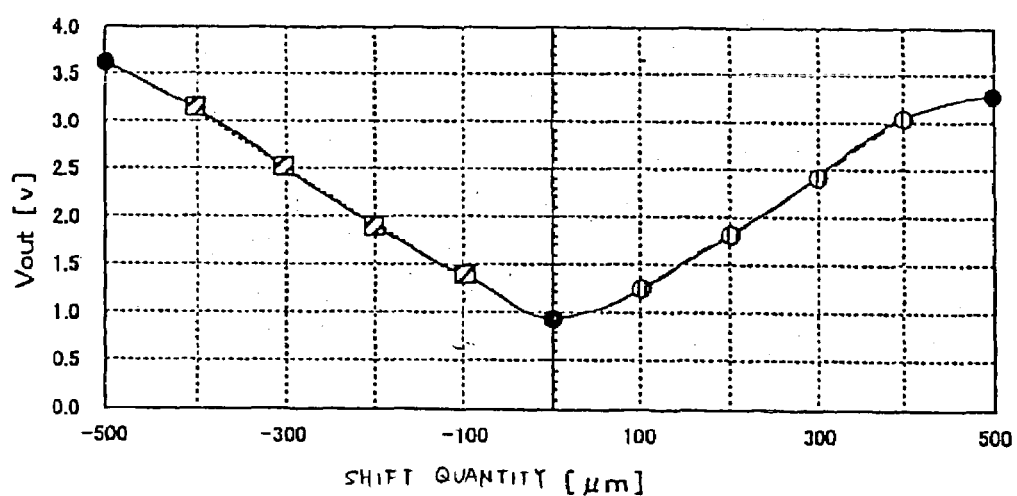
FIG. 6 is a diagram obtained by performing predetermined numbers of sampling by a predetermined sampling period after a lapse of predetermined time, based on a trailing timing of the regular reflected light as a reference, and plotting an output value obtained by designating the output mean value as a sensor output value of each patch, with respect to the shift quantity.

The sensor output waveform is shown in FIG. 5 (time is plotted on lateral axis, and output value is plotted on longitudinal axis). In this embodiment, a reflecting photo sensor comprising an LED light emitting element and a photoreceptor that can obtain both the regular reflected light output and diffused light output, is used as the color misalignment detection sensor. Here, the regular reflected light output is provided as a toner density detection sensor of the Bk toner (because with the Bk toner, diffused light output cannot be obtained). However, it is difficult to set the leading timing of a certain diffused light output as the detection start timing, since the output value obtained in this manner is different for each patch. Therefore, the detection start timing of the diffused light output in each patch is based on the trailing timing of the regular reflected light, and after lapse of predetermined time, a predetermined number of sampling is carried out by a predetermined sampling period, and the output mean value is set to be a sensor output value in each patch. In FIG. 6, the output value obtained in this manner is plotted with respect to the shift quantity. The calculated value of an intersection point of these two line segments has been 1.31 μm. A pattern in which the shift quantity is optionally shifted is formed, to determine an error with respect to the ideal value of the displacement quantity. Since all of these indicate 10 μm or below, it can be confirmed that color misalignment can be detected sufficiently, by such a method.

Figure 8:
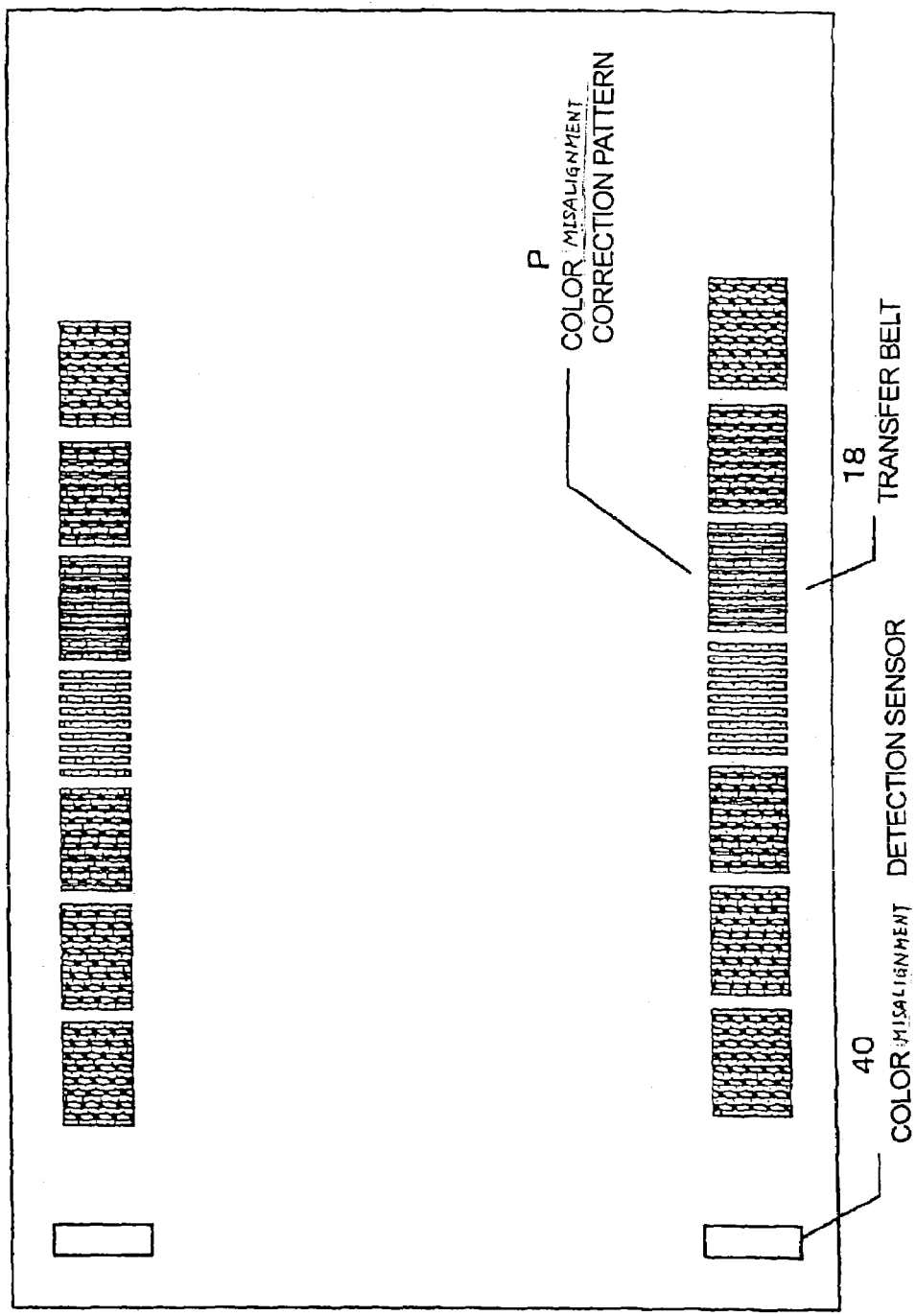
FIG. 8 is a plan view that shows the relation between a patch formed on the transfer belt and a color misalignment detection sensor.

Such a patch is formed on opposite sides of the transfer belt 18, as shown in FIG. 8, and a sensor output obtained from these patches is obtained, to make it easy to correct the skew quantity, in addition to the correction of displacement in the horizontal scanning direction and the vertical scanning direction.

Particularly, when such a patch is used, the displacement quantity can be directly calculated with respect to the displacement in the horizontal scanning direction, as compared with a conventional method of detecting the color misalignment quantity by a combination of horizontal lines and oblique lines, thereby the detection error can be made extremely small.

Since the trailing output of the regular reflected light can be obtained in each patch, by providing a predetermined interval in these patch groups, detection of the output value of the diffused light output, different for each patch, becomes easy.

Figure 9:
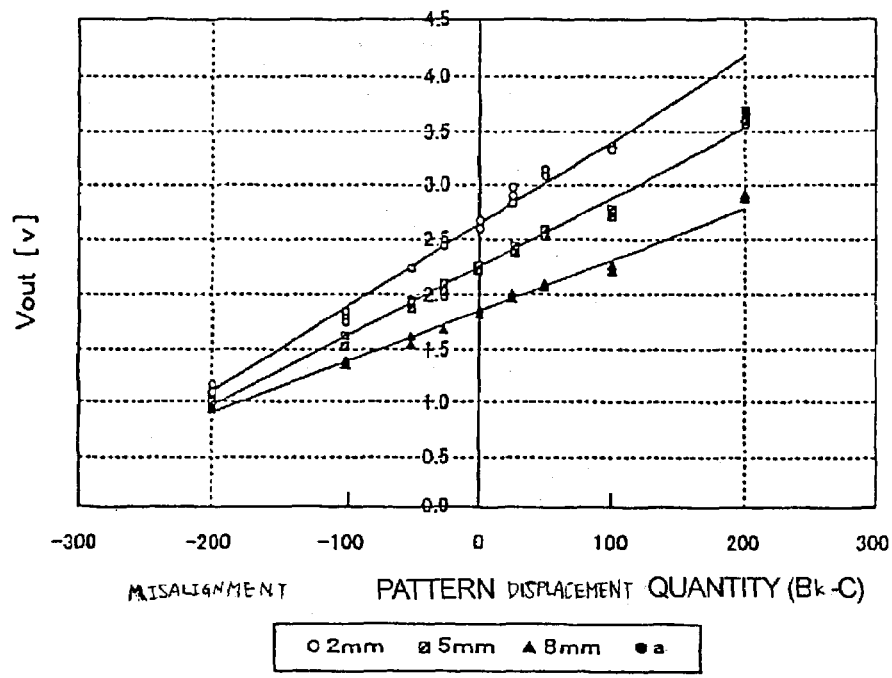
FIG. 9 shows the distance dependency of the sensor output.
Figure 10:
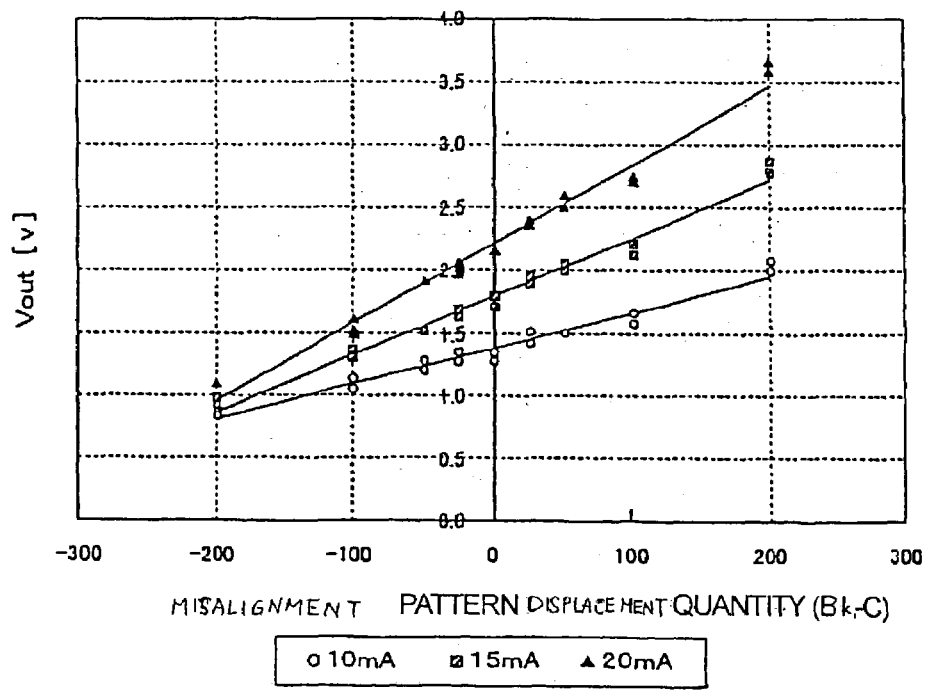
FIG. 10 shows the LED current dependency of the sensor output.
Figure 11:
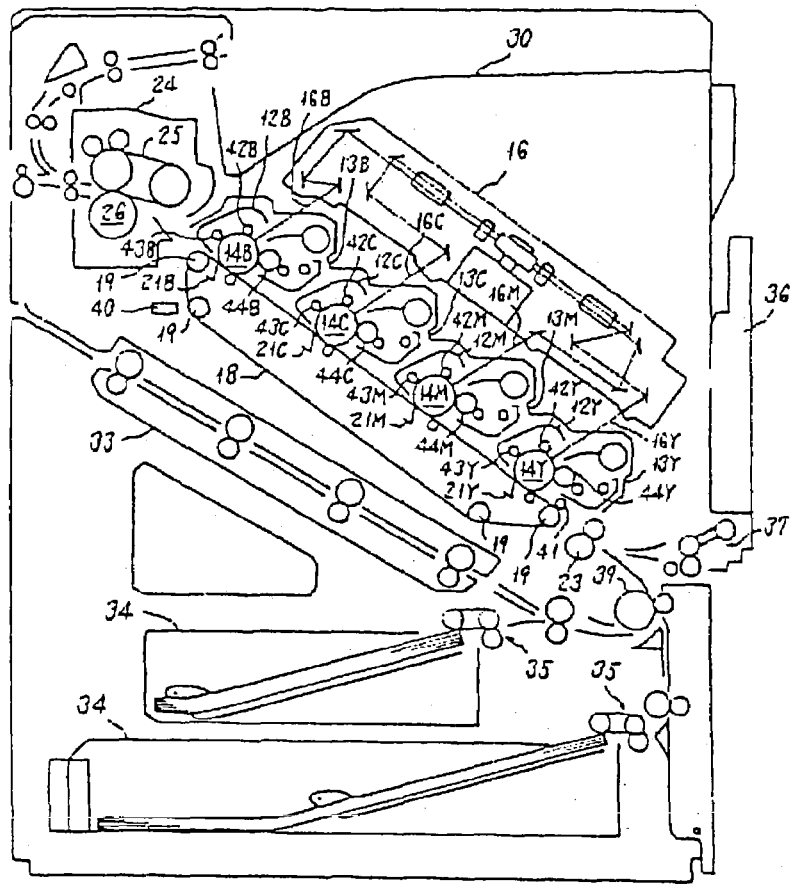
FIG. 11 is a schematic front view of a color printer, as an image formation apparatus in a second embodiment of the present invention.

If the method of calculating the color misalignment quantity by determining an intersection point of two line segments is used, the color misalignment correction is not affected by the dependency of the output value with respect to the distance of the sensor fitted surface as shown in FIG. 9, or the dependency of the output value with respect to the LED current set value as shown in FIG. 10, and hence stable color misalignment correction can be performed.

Formation of the misalignment correction pattern P, pattern detection, and control of the misalignment correction based on the detected pattern are executed by a Central Processing Unit (CPU) in a control circuit (not shown), using a Random Access Memory (RAM) (not shown) as a work area, according to a program stored in a Read-Only Memory (ROM) (not shown).

As explained above, according to the present invention, with respect to the reference pattern obtained by forming a plurality of lines at a predetermined pitch by the black toner, being the reference color, a pattern obtained by superposing the reference pattern on a color pattern to be corrected of a color toner comprising a plurality of lines at the same pitch is formed as one patch, and a plurality of patches are continuously formed along the movement direction of the intermediate transfer body to form a patch group, with the relative position of the lines shifted in the pitch direction of the line by an optional quantity. The black toner, being the reference color, is the last color to be superposed on the transfer body, and a pattern in which the color pattern to be corrected is completely superposed on or completely displaced from the reference pattern is designated as a reference patch. As a result, a correction pattern that can detect color misalignment at high accuracy can be formed.

According to the present invention, since an intersection point of two approximate lines, in the output obtained on the opposite sides of a inflection point in an optical detection value in each patch with respect to an optional shift quantity in the continuous respective patch groups in the formed correction pattern is calculated, and color misalignment correction is performed based on the intersection coordinates, highly accurate misalignment correction becomes possible.

According to the present invention, a color misalignment correction pattern is formed, color misalignment is detected by the correction pattern, and correction is performed based on the detected color misalignment, thereby enabling color image formation in which highly accurate misalignment correction can be performed.

In a color printer according to a second embodiment, color misalignment adjusting operation is carried out prior to the above-described image forming operation. In the color misalignment adjusting operation, an alignment pattern described later is formed on the transfer belt 18, and this alignment pattern is read (detected) by an alignment pattern detection sensor 40 as an alignment pattern detection unit, to thereby perform the color misalignment adjusting operation.

The alignment pattern detection sensor 40 is arranged on the lower side of the transfer belt 18, facing the photosensitive drum 14B.

Figure 12:
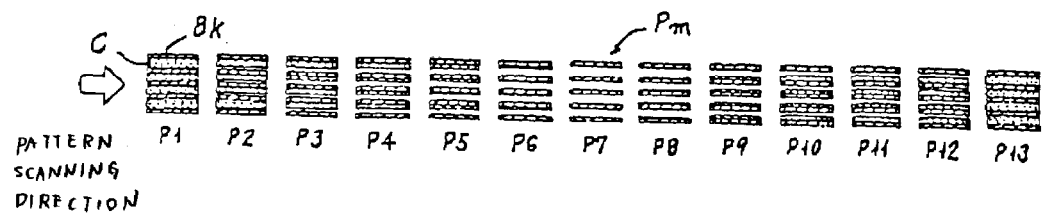
FIG. 12 is a schematic plan view that shows an alignment pattern for detecting misalignment in the horizontal scanning direction.

An alignment pattern Pm for detecting the misalignment in the horizontal scanning direction is configured, as shown in FIG. 12, by designating a plurality of lines formed by superposing the black line image Bk, being the reference color, and a color line image other than the reference color, for example, a cyan line image C, as one patch, and continuously forming these patches by shifting the relative position of the line images of the two colors by an optional quantity (by an optional shift quantity). However, it does not mean that the reference color is restricted to black (the same applies in the following other embodiments).

Here, "optional shift quantity" includes a case when the shift quantity is not always constant, such that a shift quantity between P1 and P2 is 50 μP, and a shift quantity between P2 and P3 is 20 μP.

In this embodiment, the alignment pattern Pm has a configuration such that one patch is formed by superposing a black line having a width of 12 dots (=0.508 mm) on a color line other than the reference color having the same width, and 13 patches are arranged with the color line C shifted by 2 dots with respect to the Bk line.

Here, the meaning of "continuously forming the patches" implicates that the patches are arranged along the scanning direction (in the running direction of the transfer belt 18), and even if the arrangement thereof is out of order, such as in order of P1, P11, P2, and P10, these are considered to be continuously formed. Further, even if the interval between P1 and P2, and the interval between P2 and P3 are out of order, these are considered to be continuously formed.

Figure 13A:
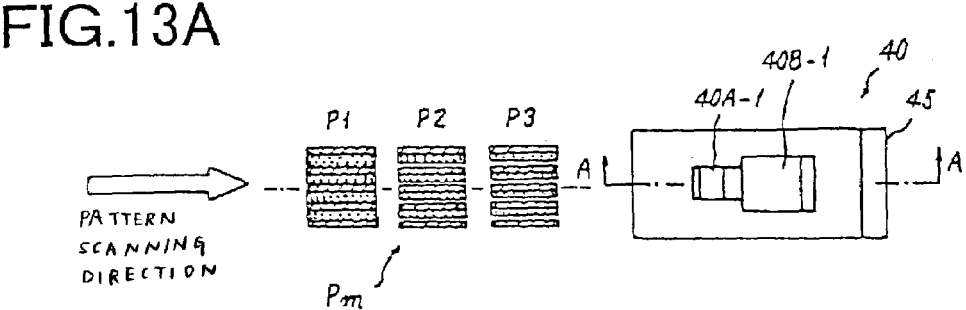
FIGS. 13A and 13B are schematic plan views that show arrangement of the alignment pattern detection sensors in the scanning direction of the alignment pattern.
Figure 13B:
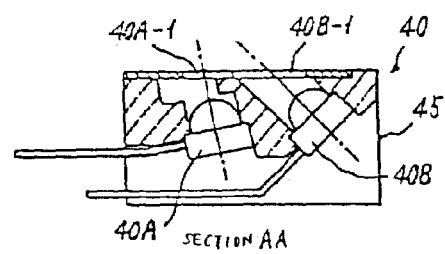

The alignment pattern detection sensor 40 in the embodiment has, as shown in FIG. 13B, a Light Emitting Diode (LED) 40A as a light emitting section, and a PhotoDiode (PD) 40B as a light receiver, and these elements are supported by a support base 45. The light receiver may be formed of a phototransistor instead of the photodiode 40B.

The light emitting diode 40A and the photodiode 40B are arranged along the scanning direction of the alignment pattern Pm, and the photodiode 40B is arranged so as to be able to receive only the diffused reflected light in the reflected light from the alignment pattern Pm.

As shown in FIG. 13A, the spot shape 40A-1 of the light emitting diode 40A and the spot shape 40B-1 of the photodiode 40B are formed in a square shape. The spot shapes of the light emitting diode 40A and the photodiode 40B are determined by the shape of a slit formed on the upper face of the support base 45.

Figure 14:
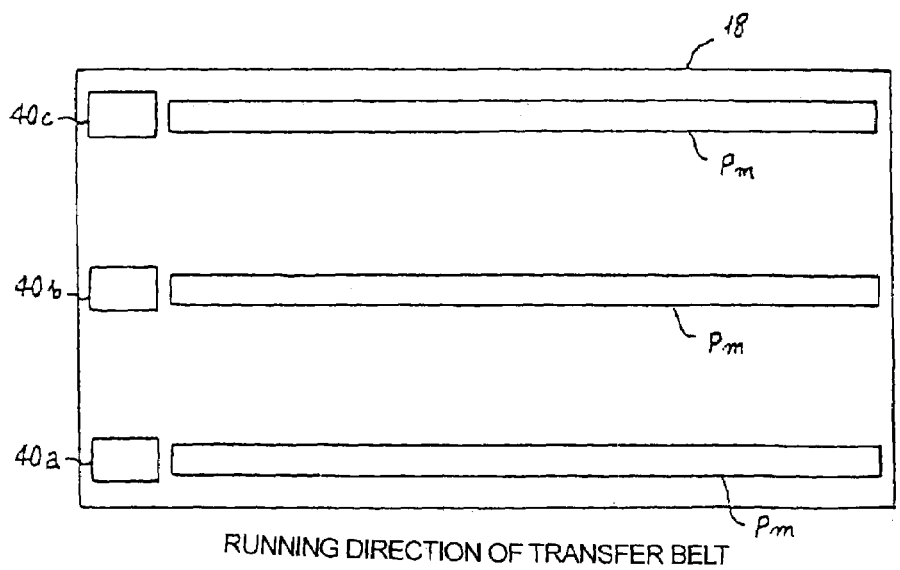
FIG. 14 is a schematic plan view that shows the position of the formation position of the alignment pattern on the transfer belt and the alignment pattern detection sensor.

The alignment pattern Pm is formed, as shown in FIG. 14, at three positions, on the opposite sides and at the center of the transfer belt 18, and three alignment pattern detection sensors 40 (40a, 40b, 40c) are provided corresponding thereto, and supported on the support base (not shown). Of the alignment pattern detection sensors 40a, 40b and 40c, two sensors arranged on the opposite sides of the transfer belt 18 detect the displacement quantity of the alignment pattern Pm for detecting a misalignment in the horizontal scanning direction shown in FIG. 12, to thereby perform correction of a displacement in the horizontal scanning direction and a magnification error.

The three sensors arranged on the opposite sides and at the center of the transfer belt 18 detect the displacement quantity of an alignment pattern Ps for detecting a misalignment in the vertical scanning direction shown in FIG. 38, to thereby perform correction of a displacement in the vertical scanning direction and skew.

Reasons why the light receiver in the alignment pattern detection sensor 40 can receive only the diffused reflected light, and why the spot shape of at least the light receiver is made in a square shape, that is, the circumstances and grounds for considering and realizing the present invention will be explained below.

Figure 47:
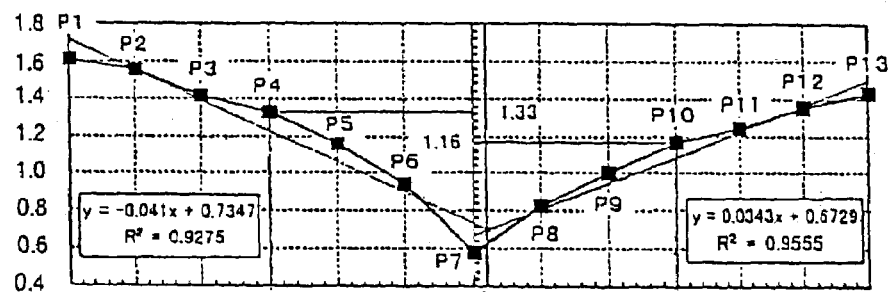
FIG. 47 is a graph that shows a calculation result of the output voltage of the alignment pattern and an intersection point, when the conventional optical sensor is used.

As shown in FIG. 47, in the misalignment detection by the conventional optical sensor, output characteristics that is hardly a straight line is obtained.

Figure 20:
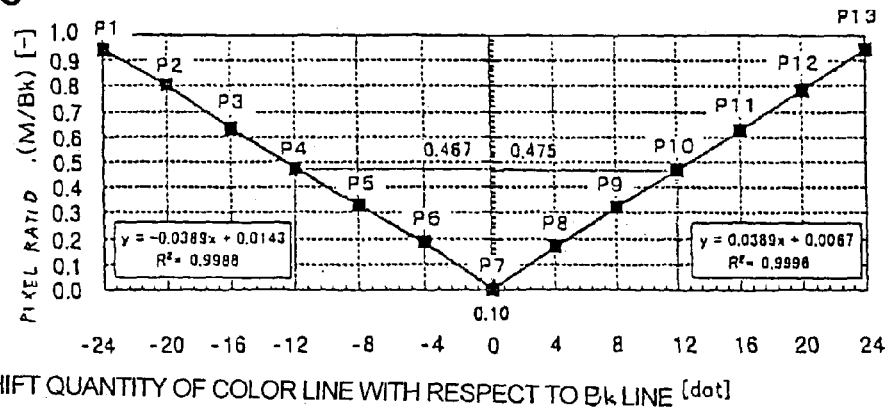
FIG. 20 is a graph that shows an actual measurement value of a color line width of each patch observed through a microscope.

However, as a result of measuring an actual displacement quantity of an alignment pattern formed on the transfer belt 18 by a digital microscope equipped with 2,000,000 pixel CCD, as shown in FIG. 20, since the two lines are completely superposed, the displacement quantity at P7 is substantially zero. This means that an error has occurred in the light emitting, light receiving, and outputting processes of the conventional optical sensor, though a misalignment hardly occurs in the actual alignment pattern.

As shown in FIG. 20, in the approximate line obtained by plotted spots on the negative side with respect to the extreme value, R2 is 0.9988, and in the approximate line obtained by plotted spots on the positive side with respect to the extreme value, R2 is 0.9996, that is, a result infinitely close to the line (R2) can be obtained. As a result of calculating an intersection point by the two lines, actually a value substantially close to 0, such that the misalignment quantity is 4.13 μm, is obtained.

The following two reasons can be mentioned for the difference between the output voltage plot of the sensor shown in FIG. 47 and a plot of a displacement quantity by the microscope shown in FIG. 20.

(1) In the microscopic result shown in FIG. 20, a difference in the displacement quantity between adjacent patches is substantially constant (=linear), whereas in the output voltage value shown in FIG. 47, a difference (=variation) in the output voltage between adjacent patches decreases, as the distance from the extreme value increases.

(2) In the microscopic result shown in FIG. 20, a displacement quantity between patches having a mirror image relation (for example, P4 and P10) is substantially equal, whereas in the output voltage shown in FIG. 47, a difference can be seen in the output voltage between patches having a mirror image relation (for example, P4 and P10).

Therefore, if a measure is taken against these causes, it can be presumed that highly accurate misalignment quantity can be calculated from an intersection calculation result obtained from two lines obtained from the plot of the actual sensor signal output.

Figure 21:
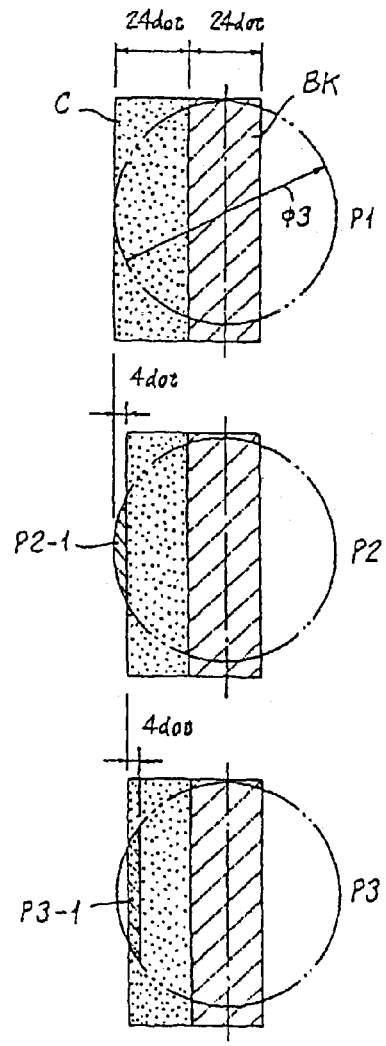
FIG. 21 shows the non-linearity in an increase in an area caused by a circular light receiving plane in the conventional optical sensor.

In order to consider the result of (1), the relation between the shape of a light receiving plane of the conventional sensor and the pattern is shown in FIG. 21.

Since it can be considered that the diffused light output voltage of the sensor has certain correlation with respect to an area increase of the color line portion in the light receiving plane, if the area increase is constant with respect to the difference (in this case, 4 dots) in the displacement quantity between adjacent patches, the output voltage should be linear.

However, as is obvious from FIG. 21, it is seen that since the light receiving plane is circular, if "a variation in the area with respect to the shift of the color line by 4 dots in P1 and P2 (the area P2-1 in P2)" is compared with "a variation in the area with respect to the shift of the color line by 4 dots in P2 and P3 (the area P3-1 in P3)", the variation becomes larger in the latter. This is not limited when the light receiving plane is circular, but applies when the light receiving plane is elliptical or the like.

Therefore, it can be seen that the shape of the light receiving plane needs only to be changed to, for example, square, in order to make the area increase in the color line portion in the light receiving plane constant with respect to the shift quantity.

In order to verify that the result of (1) is obtained because the light receiving plane is circular, it is assumed that "the diffused light output of the optical sensor has a linear relation with respect to the area of the color line image in the light receiving plane", and the area of the color line image occupying the light receiving plane of the optical sensor is calculated for each patch of a two-color superposed pattern, to thereby perform simulation calculation such that this area value is designated as the output value of each patch.

A calculation for obtaining a detection error of misalignment quantity is also carried out by calculating an intersection point of two lines or approximate two lines, obtained when plotting this area value with respect to the "shift quantity of a color line image with respect to the reference color (black) on the lateral axis".

Figure 22:
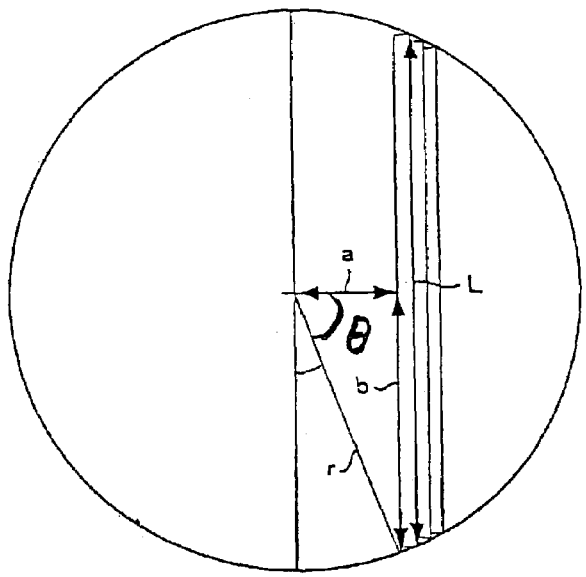
FIG. 22 is a diagram for obtaining an area of a rectangle in the circular light receiving plane.

Calculation Expression:

As shown in FIG. 22, the area S of a rectangle of one section positioned at a distance a from the center of the light receiving plane can be expressed by a function of the distance a from the center of the light receiving plane, such that $S=2\times[a\times\tan(a\cos(a/1.5))]\times(25.4/600)$.

Calculation Condition:

(1) light receiving diameter of the sensor, (diameter=3.0 mm)

(2) line width (Bk, Color), 24 dots (=1.016 mm)

* Here, 600 dpi, that is, 1 dot=42.3 μm.

Figure 23:
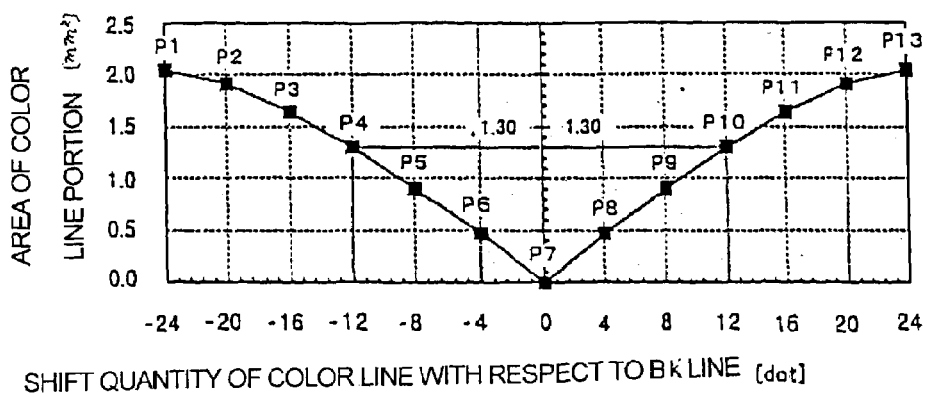
FIG. 23 is a graph that shows a simulation result of the area of a color line portion with respect to the shift quantity of the color line.

FIG. 23 shows a calculation result by simulation. The result shown in FIG. 23 shows that the tendency with respect to the lateral axis is substantially equal to that of the result of the output voltage shown in FIG. 47. Therefore, it is confirmed that when the shape of the light receiving plane is circular, as shown in Japanese Patent No. 3254244, Japanese Patent Application Laid-Open No. HEI 11-291477, and the like, linearity cannot be obtained in the output characteristic of the sensor with respect to the shift quantity of the color line, that is, the output characteristic is nonlinear, under the condition that each color line in a patch formed by superposing two color lines is set as a superposition of one line, being the minimum number of elements.

Therefore, if the shape of the light receiving plane of the optical sensor for detecting the alignment pattern, obtained by designating a plurality of line images configured by superposition of two color line images as one patch, and continuously forming the patches with the relative position of the two color line images shifted by an optional quantity, is circular, nonlinearity occurs in the output characteristic with respect to the optional shift quantity, and hence highly accurate misalignment detection cannot be performed. As a result, it is concluded that it is necessary that the shape of the light receiving plane is set to a shape in which the area increase in the color line section in the light receiving plane with respect to the shift quantity becomes constant, for example, square or rectangle.

Reason for obtaining the result of (2) is studied.

As a reason why the outputs of patches having the mirror image relation with respect to the extreme value described in (2) are different, it can be considered that the area of the color toner portion is different in these patches, as in (1).

Therefore, similar simulation calculation is conducted for a case when the center of the black line has been shifted by 2 dots with respect to the center of the light receiving plane. The result thereof is shown in FIG. 24.

Figure 24:
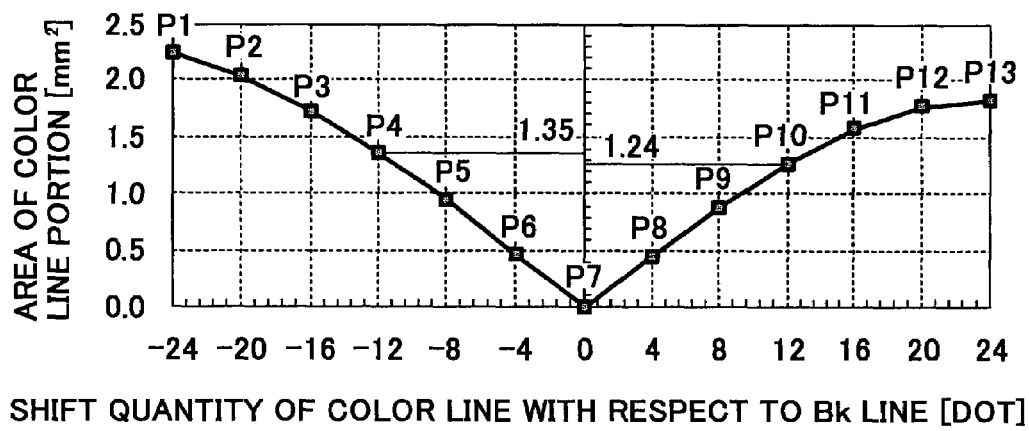
FIG. 24 is a graph that shows a simulation result when the center of the Bk line is shifted with respect to the center of the light receiving plane.

As shown in FIG. 24, it has been found that the center of the Bk line, being the reference color, is shifted with respect to the center of the light receiving plane, thereby the output voltage of the patches having the mirror image relation does not becomes equal. From this finding, it is considered that when the experiments shown in FIG. 47 is conducted, it is assumed that the center of the Bk line is aligned with the center of the light receiving plane, but actually, it is slightly displaced.

The results shown in FIG. 47 are for a case when the number of lines is set to be the minimum number of elements, and in order to eliminate such an error factor, it is considered that a sufficiently wide light receiving width needs only be ensured with respect to the line width.

Here, possibility of another factor causing a difference in the output voltage of patches having the mirror image relation is considered. In the optical sensor shown in FIGS. 46A and 46b, as described above, the light emitting element is formed of the LED, and the photoreceptor is formed of the phototransistor. These elements have directional characteristic as the characteristic of an element itself.

Figure 25:
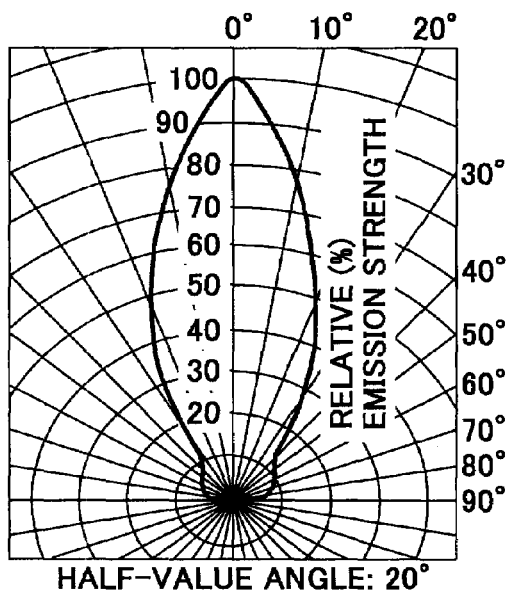
FIG. 25 shows directional characteristic of a light emitting element in the conventional optical sensor.
Figure 26:
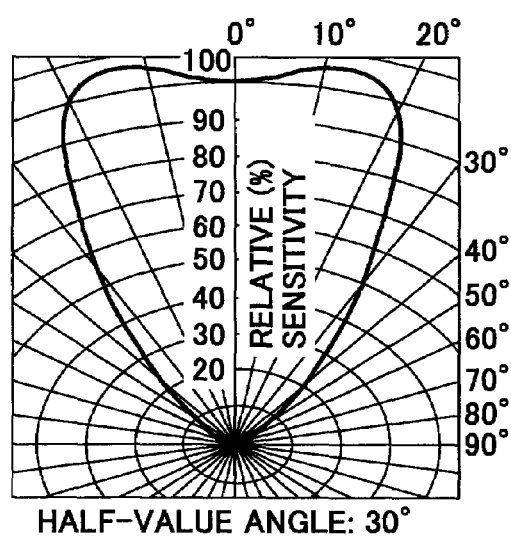
FIG. 26 shows directional characteristic of a photoreceptor in the conventional optical sensor.
Figure 27A:
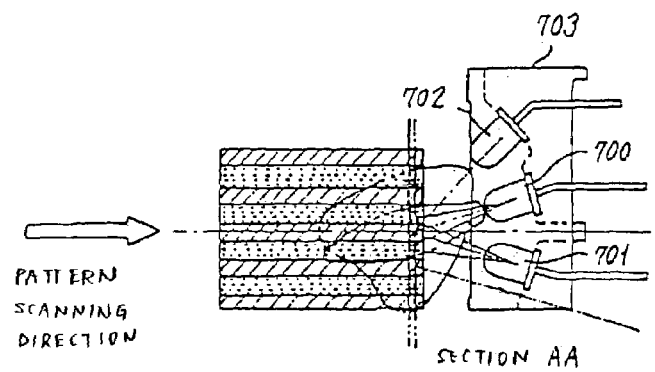
FIGS. 27A and 27B are schematic plan views that show the directional characteristic of each element in the conventional optical sensor, with respect to the scanning direction of the alignment pattern.
Figure 27B:
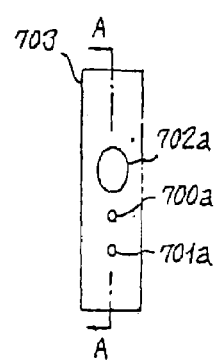
Figure 46A:
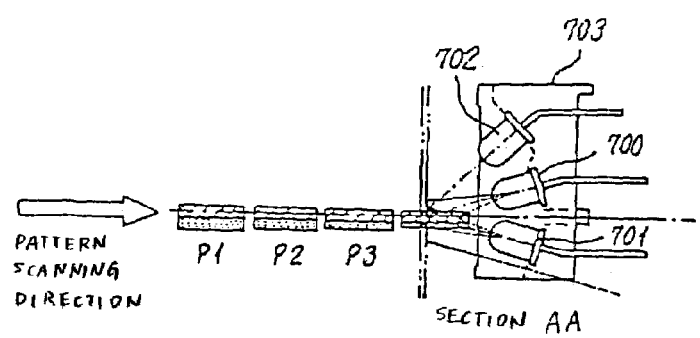
FIGS. 46A and 46B are schematic plan views that show the arrangement of respective elements in the conventional optical sensor, with respect to the scanning direction of the alignment pattern.
Figure 46B:
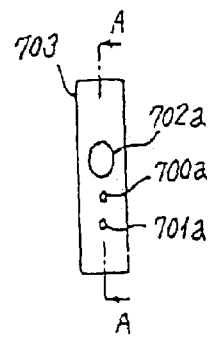

FIG. 25 shows the directional characteristic of the LED shown in FIGS. 46A and 46B, and FIG. 26 shows the directional characteristic of the phototransistor shown in FIGS. 46A and 46B. Since the single element has the directional characteristic as shown in FIG. 25 and FIG. 26, if these elements are arranged, as shown in FIG. 27, such that the central axes of the directional characteristic of the light emitting element and the photoreceptor is shifted from each other with respect to the pattern scanning direction (the conventional sensor arrangement), there is clearly an output distribution in the light receiving area, and the output voltage of patches having the mirror image relation described in (2) may be different.

Therefore, in the optical sensor for detecting the alignment pattern obtained by designating a plurality of line images configured by superposition of two color line images as one patch, and continuously forming the patches with the relative position of the two color line images shifted by an optional quantity, it is necessary that the central axes of the directional characteristic of the light emitting element and the photoreceptor agree with the pattern scanning direction. In other words, it is necessary to arrange the light emitting element and the photoreceptor along the scanning direction of the pattern.

Figure 15:
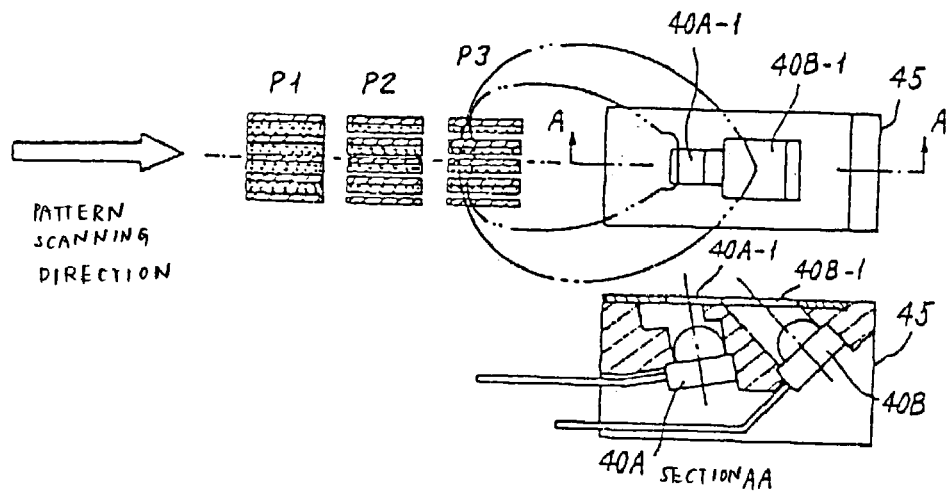
FIG. 15 is a schematic plan view that shows the state in which the central axis in directional characteristics of the respective elements in the alignment pattern detection sensor is adjusted with respect to the scanning direction of the alignment pattern.

Based on the finding from this experiment, as shown in FIG. 15, this embodiment has an arrangement such that the central axes of the directional characteristic of the light emitting diode 40A and the photodiode 40B are made to agree with respect to the pattern scanning direction.

Figure 16:
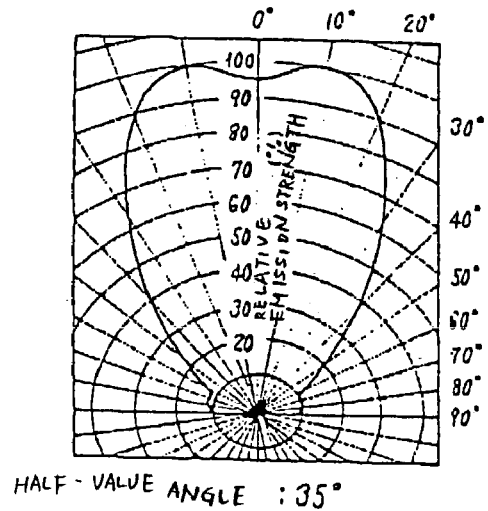
FIG. 16 shows the directional characteristic of a light emitting section in the alignment pattern detection sensor.
Figure 17:
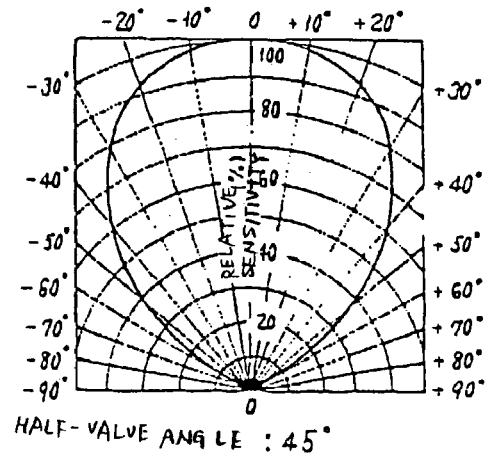
FIG. 17 shows the directional characteristic of a light receiver in the alignment pattern detection sensor.

In order to make the light intensity distribution and the light receiving sensitivity distribution in the light receiving plane uniform as much as possible, a photoreceptor having a wide directional angle is selected. FIG. 16 shows the directional characteristic of the light emitting diode 40A, and FIG. 17 shows the directional characteristic of the photodiode 40B. With respect to the conventional optical sensor shown in FIGS. 46A and 46b, the half-value angle of the light emitting diode 40A is set to 35°, and the half-value angle of the photodiode 40B is set to 45°, thereby changing the half-value angle to as wide as 30° or more, as compared with the conventional optical sensor.

In the conventional optical sensor shown in FIGS. 46A and 46B, it is only required that the sensor element has high output, and elements referred to as radial type, top-view type, or bombshell type are employed for the light emitting element and the photoreceptor.

On the other hand, in this embodiment, as described above, a so-called side-view type element having a wide directional angle, and small difference in the directional characteristic of the element is selected, due to the process of manufacture, in order to decrease the light emission distribution and the light receiving sensitivity distribution in the light receiving plane as small as possible.

In this embodiment, a belt made of polyimide having a brightness L*(JISZ8729) of 1.7 is used for the transfer belt 18, on which the alignment pattern Pm is formed. The reason why the above-described configuration including this is used will be described in more detail below.

Figure 28:
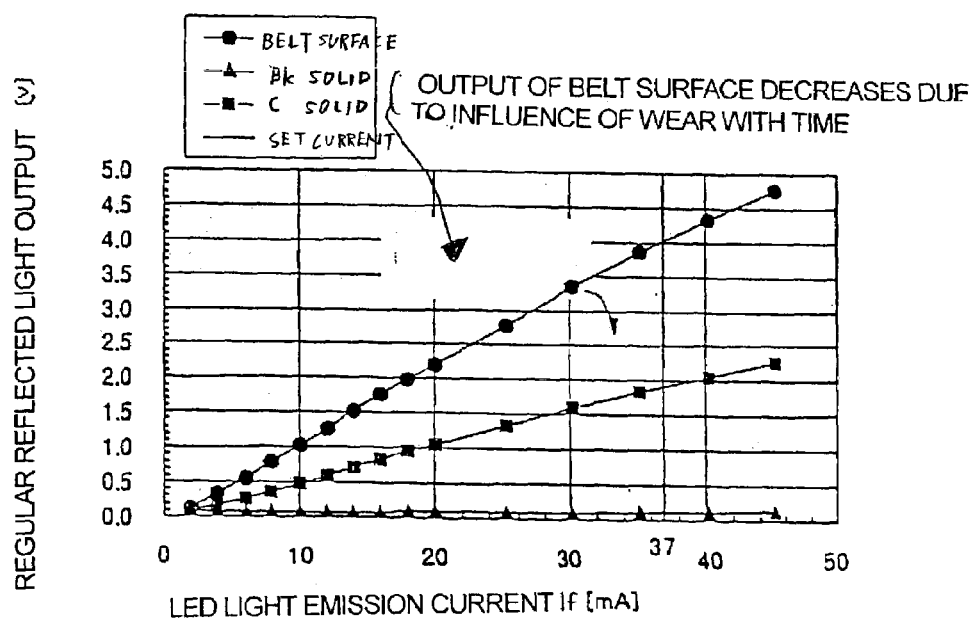
FIG. 28 is a graph that shows the relation between LED light emission current and regular reflected light output in the conventional optical sensor.

Configuration of Alignment Pattern:

FIG. 28 is a graph plotting the regular reflected light output voltage of the belt ground portion, the Bk solid patch portion, and C (cyan) patch portion of the conventional sensor shown in FIGS. 46A and 46B, with respect to the LED current on the lateral axis.

Here, for example, when the output voltage of the respective patch portions at the time of setting the LED current (=37 mA) when the output voltage of the ground portion of the transfer belt becomes 4.0 v is observed, the result as shown in Table 1 can be obtained.

TABLE 1

Regular reflected light output (at time of IF = 37 mA)

| LED current | Regular reflected light output voltage [v] | | |
|---|---|---|---|
| [mA] | Belt face | Bk solid | Cyan solid |
| 37 | 4.00 | 0.12 | 1.91 |

Here, if it is considered to read the alignment pattern in FIG. 28 by the regular reflected light output, the area ratio of P1 and P13 is black line×50%+color portion line×50%, and the area ratio of P7 is black line×50%+belt line×50%, and hence the sensor output of the respective patch portion becomes substantially as follows.

The case where "Bk line group" is formed above "color line group":

The output voltage of P1 and P13=0.12 (Bk solid)×0.5+1.91 (C solid)×0.5=1.015 v.

The output voltage of P7=0.12 (Bk solid)×0.5+4.0 (belt portion)×0.5=2.06 v.

The case where "Bk line group" is formed below "color line group":

The output voltage of P1 and P13=0.12 (Bk solid)×0.5+1.91 (C solid)×0.5=1.015 v.

The output voltage of P7=1.91 (C solid)×0.5+4.0 (belt portion)×0.5=2.955 v.

Figure 29:
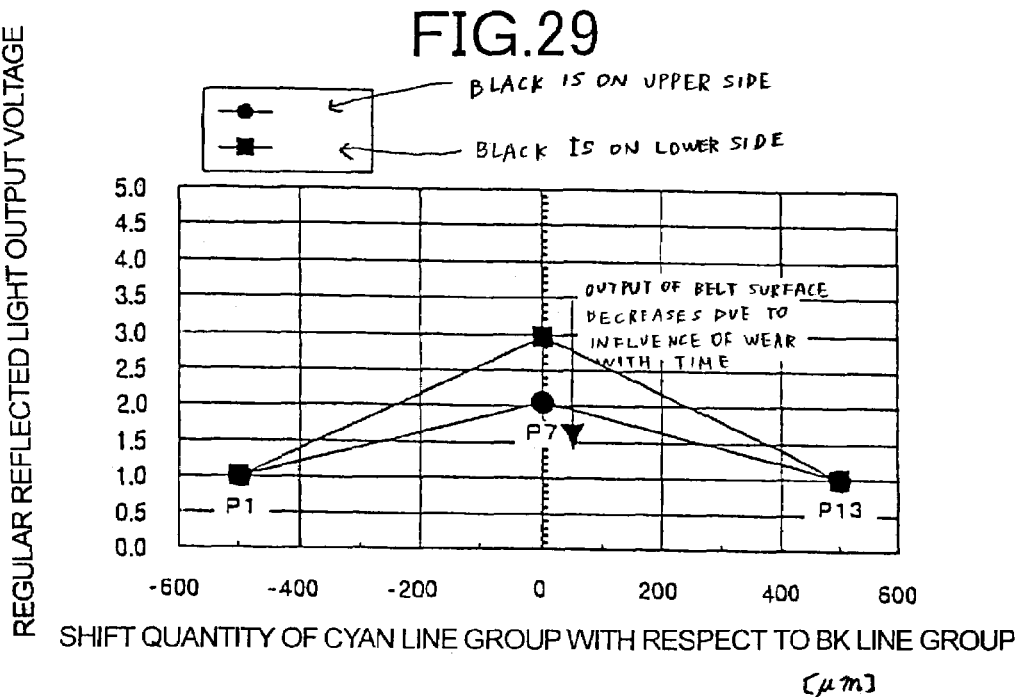
FIG. 29 is a graph that shows the misalignment pattern output, when detection is performed by regular reflected light in the conventional optical sensor.

When the output voltage of the respective patches is plotted with respect to an "optional shift quantity of color lines on lateral axis", the result as shown in FIG. 29 can be obtained. From FIG. 29, the followings can be found.

The case where detection is performed by regular reflected light:

(a) The output voltage becomes largest in the patch (P7) where the two color lines are completely superposed, and the output voltage thereof is substantially determined by the output from the belt ground portion.

(b) The output difference between the minimum value (P1, P13) and the maximum value (P7) decreases when the "black line group" is above the "color line group", as compared with when "black line group" is below the "color line group".

As described above, since the output of the maximal value (P7), when detection by the regular reflected light is performed, is determined by the output (∝ glossiness) from the belt ground portion, (c) if glossiness decreases due to wear with time, a partial defect, or the like, the output of that portion decreases. In other words, since detection cannot be performed due to deterioration of the belt by wear with time, the life of the belt is determined by this.

That is, the regular reflected light output voltage of the patch portion where the belt face is partially exposed, as in P2 to P12 shown in FIG. 12, is likely to be affected by noise of the surface configuration characteristic expressed by the belt glossiness or the surface roughness Rz. Therefore, for example, if there is a defect in the ground portion of P6 patch, the output becomes different between P6 and P8 having the mirror image relation therewith, and as a result, the position of intersection point determined by calculation is shifted.

On the other hand, when detection is performed by the diffused reflected light, misalignment quantity can be detected without being affected by the surface roughness of the transfer belt 18.

Figure 30:
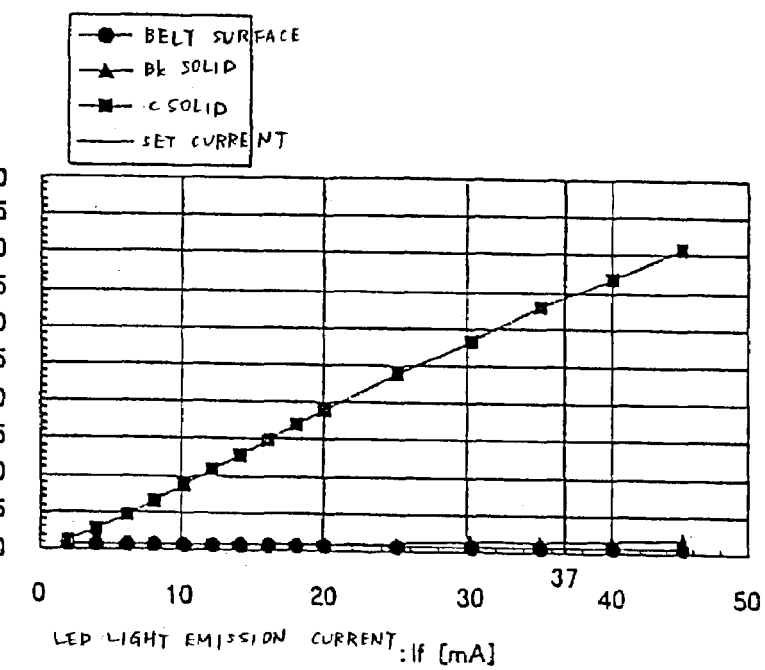
FIG. 30 is a graph that shows the relation between LED light emission current and diffused reflected light output in the conventional optical sensor.

FIG. 30 is a graph plotting the diffused reflected light output voltage of the belt ground portion, the Bk solid portion, and the C (cyan) solid portion of the conventional sensor shown in FIGS. 46A and 46B, with respect to the LED current on the lateral axis.

Figure 32:
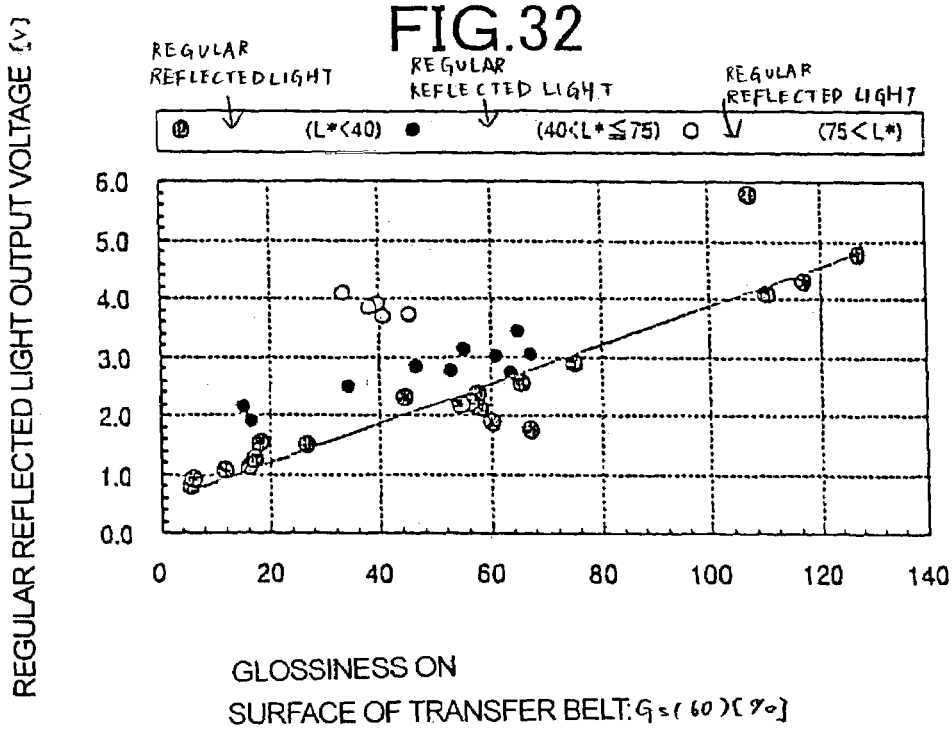
FIG. 32 is a graph that shows the relation between glossiness on the surface of the transfer belt and the sensor output.
Figure 33:
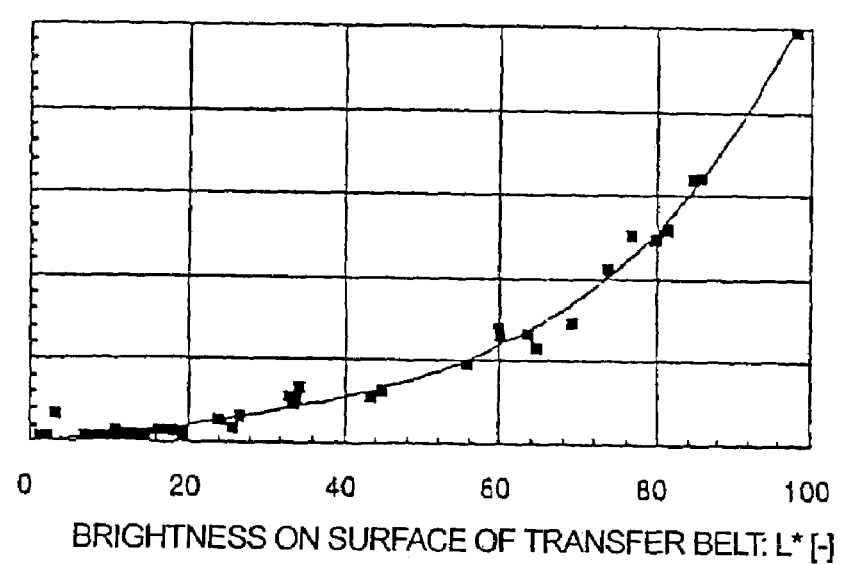
FIG. 33 is a graph that shows the relation between brightness on the surface of the transfer belt and the diffused light output.

As shown in FIG. 32, the regular reflected light output has high correlation with the glossiness of an object to be detected (the transfer belt 18 on which the alignment pattern is formed), whereas the diffused reflected light output has high correlation with the brightness L* of the object to be detected, and has no correlation with the glossiness, as shown in FIG. 33. Therefore, the transfer belt 18 having L* of 1.7 equipped in the color printer in this embodiment has substantially the same output characteristic with that of the black toner. As is obvious from FIG. 33, the linearity can be obtained up to brightness L* of about 40, and the linearity is very high up to brightness L* of 20.

Here, if two cases are considered in the similar manner as described above, the result as shown in Table 2 is obtained for the output voltage in each section.

TABLE 2

Diffused reflected light output (at time of IF = 37 mA)

| LED current | Diffused reflected light output voltage [v] | | |
|---|---|---|---|
| [mA] | Belt face | Bk solid | Cyan solid |
| 37 | 0.07 | 0.16 | 3.42 |

The case where "Bk line group" is formed above "color line group":

The output voltage of P1 and P13=0.16 (Bk solid)×0.5+3.42 (C solid)×0.5=1.79 v.

The output voltage of P7=0.16 (Bk solid)×0.5+0.07 (belt portion)×0.5=0.115 v.

The case where "Bk line group" is formed below "color line group":

The output voltage of P1 and P13=0.16 (Bk solid)×0.5+ 3.42 (C solid)×0.5=1.79 v , and the output voltage of P7=3.42 (C solid)×0.5+0.07 (belt portion)×0.5=1.745 v .

Figure 31:
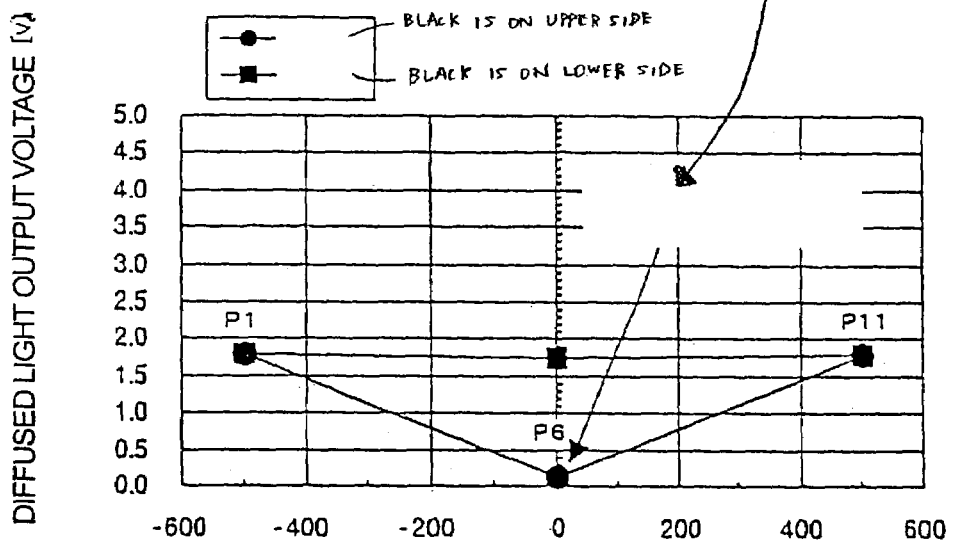
FIG. 31 is a graph that shows the misalignment pattern output, when detection is performed by diffused reflected light in the conventional optical sensor.

When the output voltage of the respective patches is plotted with respect to an "optional shift quantity of color lines on lateral axis", the result as shown in FIG. 31 can be obtained. From FIG. 31, the followings can be found.

The case where detection is performed by diffused reflected light:

(a) The output voltage becomes smallest in the patch (P7) where the two color lines are completely superposed, and the output voltage thereof is determined by the output voltage from "the color line group".

(b) The output difference between the maximum value (P1, P13) and the minimum value (P7) can be increased when the "black line group" is above the "color line group", as compared with when "black line group" is below the "color line group".

As described above, since the output of the maximum value (P7), when detection by the diffused reflected light is performed, is determined by the output ($\propto$ brightness) from the "color line group", (c) it is not affected by wear with time, a partial defect, or the like.

In other words, since detection performance does not depend on the deterioration of the belt, the life of the transfer belt can be extended.

When it is considered to detect an alignment pattern obtained by designating a plurality of lines formed by superposition of black line image, being the reference color, and a line image of other than the reference color as one patch, and continuously forming the patches with the relative position of the two color line images shifted by an optional quantity, by an optical sensor for detecting the alignment pattern, in order to perform detection without being affected by variable factors with time, such as wear of the transfer belt, a partial defect, or the like, (1) it is desired to perform detection by the diffused light output, (2) it is desired that the imaging order of the black line image, being the reference color, is the last in color superposition on the transfer body, and (3) it is desired that the brightness (L*) of the transfer body on which the alignment pattern is formed be not larger than 40, and preferably not larger than 20.

The result shown in FIG. 30 is obtained by plotting a regular reflected light output value when the LED current If is fixed to 20 mA with respect to 60° glossiness on the surface of the transfer belt on the lateral axis, for 42 types of transfer belts having different glossiness and brightness. The measurement value of glossiness shown in this figure is a value obtained by measuring the glossiness, using a gloss meter PG-1 manufactured by Nippon Denshoku Industries Co. Ltd., under a condition of measurement angle of 60°.

The result shown in FIG. 33 is obtained by plotting a diffused reflected light output when the LED current is fixed to 20 mA with respect to the brightness L* on the surface of the transfer belt on the lateral axis, for the same 42 types of transfer belts as shown in FIG. 32. The brightness measurement value shown in this figure is a value obtained by measuring the brightness, using X-Rite 938 manufacture by X-Rite, Incorporated, under conditions of a light source of D50 and an viewing angle of 2°.

A method of calculating a misalignment quantity from the output voltage value of the respective patch portions is described below.

At first, when there is no misalignment, the output becomes smallest in the patch (P7) where the two color lines are completely superposed. Therefore, two approximate lines generated on the positive side and the negative side in the X-axis direction with respect to this extreme value are obtained by, for example, the method of least squares, and a value on the lateral axis, which becomes an intersection point, is obtained, to thereby calculate the displacement quantity.

In other words, the displacement quantity $x=(d-b)/(a-c)$ can be calculated, from two simultaneous equations of linear expression, $y=ax+b$, and $y=cx+d$.

When considering a case when a color misalignment occurs, the output values of the respective patches change according to the color misalignment quantity, and hence, if an intersection point of two line segments obtained from the respective output values is determined, the color misalignment quantity can be similarly calculated.

A study relating to which data point is to be used at the time of obtaining the two approximate lines is performed. The experiment result is shown in FIG. 34.

Figure 34:
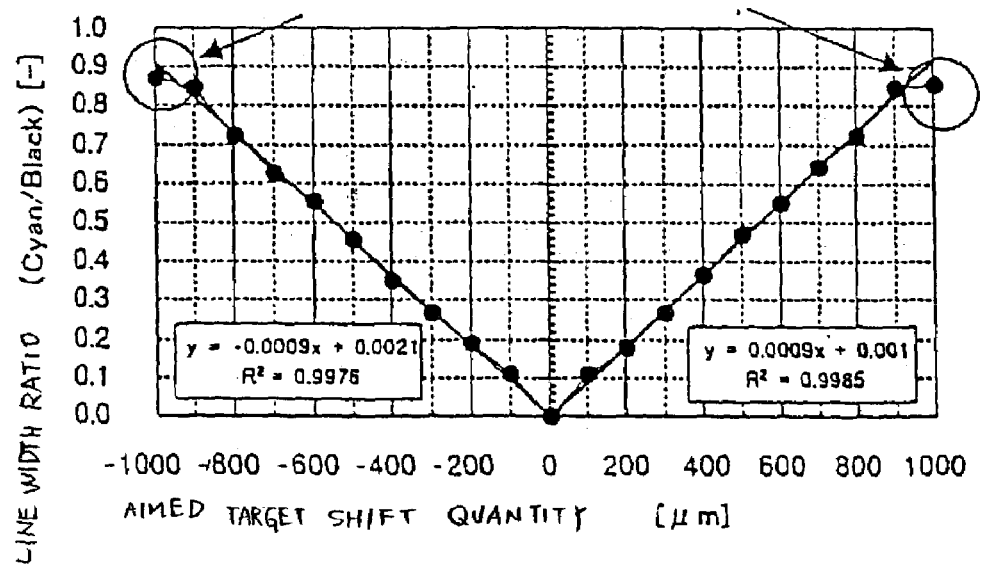
FIG. 34 is a graph that shows the observation result of a displacement quantity of the alignment pattern on the transfer belt.

The graph in FIG. 34 is obtained by the following manner. That is, an alignment pattern in which 21 patches are formed on the transfer belt 18 in a superposition pattern of a Bk line and a color line (C line) as shown in FIG. 12, with the line width of each color being 1000 μm, and with the color line shifted by 100 μm with respect to the Bk line. The line width ratio between C (cyan) and Bk of respective patches is measured by a digital microscope equipped with a 2,000,000-pixel CCD, and is plotted with respect to the "optional shift quantity of the color line on the lateral axis". It is seen that a rate of change in the line width ratio with respect to the "optional shift quantity of the color line on the lateral axis" decreases near the extreme value.

Figure 35:
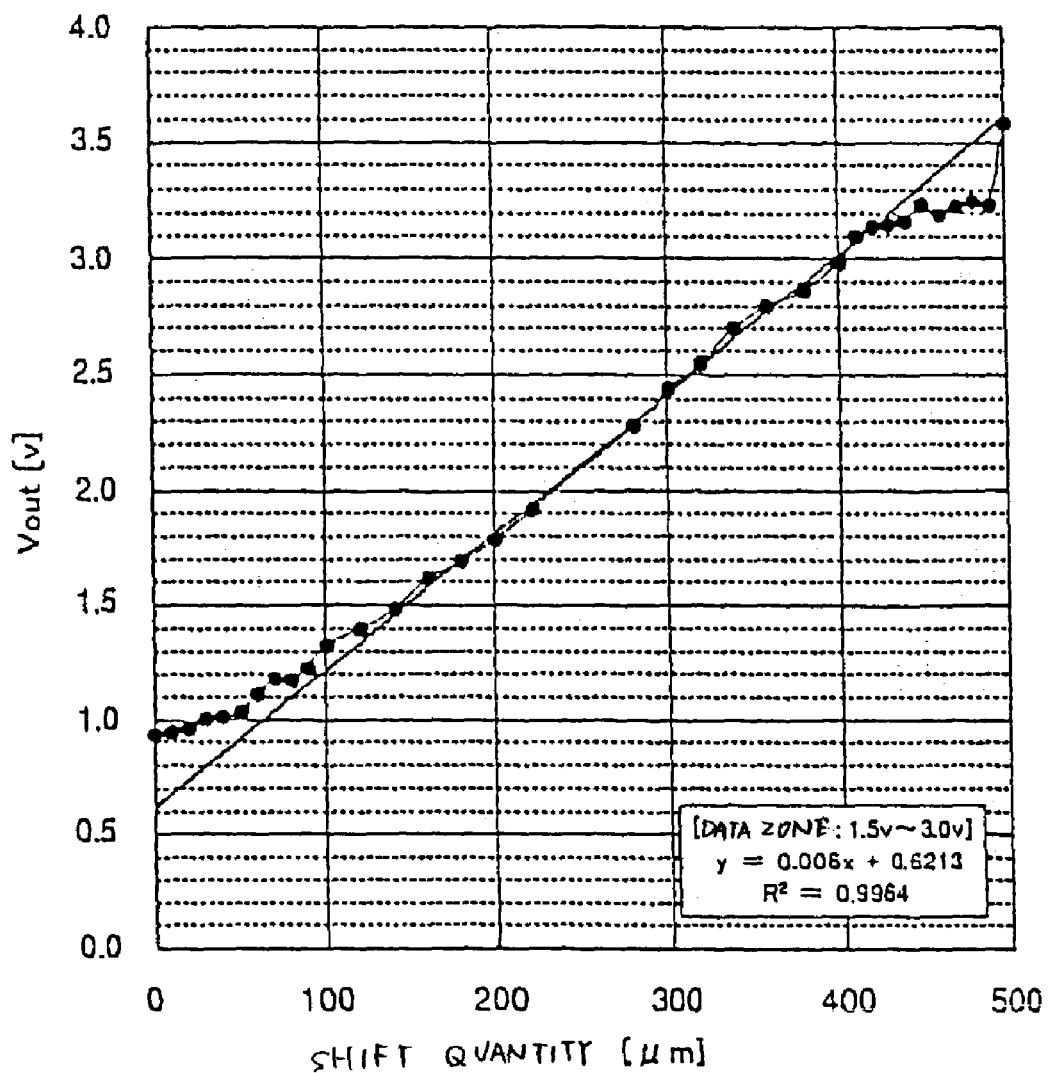
FIG. 35 is a graph that shows the observation result by a sensor of a displacement quantity of the alignment pattern on the transfer belt.

FIG. 35 is a graph that shows the relation between the shift quantity on the lateral axis and the sensor output voltage on the longitudinal axis, when the line width of the respective colors is set to 500 μm, and a patch in which the color line is shifted by 10 μm with respect to the Bk line is detected by the sensor. From this figure, it is also seen that the linearity deteriorates near the maximal value and near the minimal value.

These are studied because the actual output voltage indicates such a result that the output is saturated near the maximal value. It is confirmed that the output is saturated in the same manner in the actual patch, as shown in FIG. 34 and FIG. 35.

Therefore, it can be said that the saturation phenomenon in the output near the maximal value and near the minimal value is not a problem of the sensor, but a problem of the image formation apparatus that forms the pattern.

As a reason why such a result is obtained, it is confirmed by observation by a digital microscope that it is because thickening occurs both in the Bk line and the C line with respect to an ideal line width of 1000 μm. As the causes of such a phenomenon, influence of the toner density or the like can be mentioned. Particularly, it is confirmed that this phenomenon becomes noticeable, when a two-component type development apparatus in which the line edge effect is likely to occur is used.

Figure 36A:
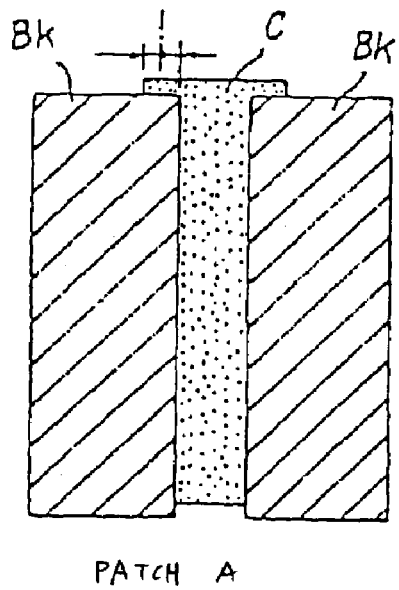
FIGS. 36A and 36B show a state in which line thickening occurs in both the Bk line and the C line.
Figure 36B:
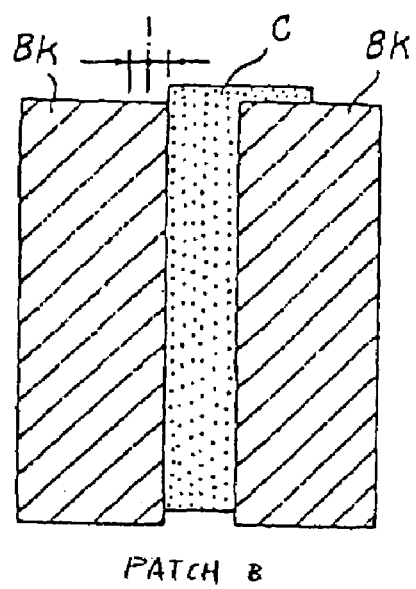

In this result, as shown in FIGS. 36A and 36B, since both the Bk line and the C line are thickened, saturation in the output has appeared only on the maximal value side. As shown in FIGS. 36A and 36B, when the both lines are thickened, even if the C line is shifted from the state of patch A shown in FIG. 36A to the state of patch B shown in FIG. 36B, no change occurs in the C line between the Bk lines, and the output becomes the same, and cannot be detected.

Based on this experimental rule, if the toner density of the Bk line is very high, and as a result, only the Bk line is thickened, or on the contrary, if the toner density of the color line is very low, and a line having a true line width is formed with respect to the latent image, it can be presumed that a similar output saturation phenomenon will occur near the minimal value.

Figure 37A:
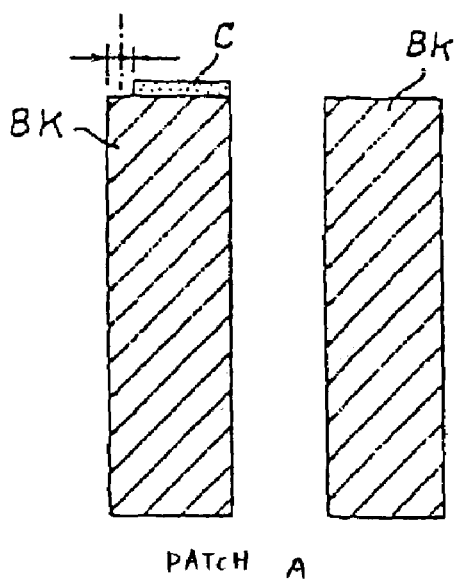
FIGS. 37A and 37B show a state in which line thickening occurs only in Bk line.
Figure 37B:
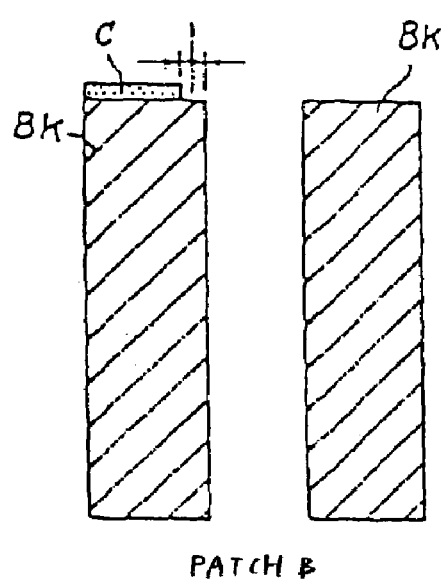

In other words, as shown in FIGS. 37A and 37B, even if the C line is shifted from the state of patch A shown in FIG. 37A to the state of patch B shown in FIG. 37B, the shift of the C line occurs within the range of the Bk line, no change occurs, and the output becomes the same, and cannot be detected.

Therefore, as for the data points used for determining the approximate line, it is desired to exclude the maximal value and the minimal value, or the data near thereof, in order to eliminate the influence by the peculiar characteristic of the image formation apparatus as much as possible. Specifically, for example, only the data of (maximum value+minimum value)/2±(maximum value−minimum value)×0.4 is used, from the maximum value and the minimum value in the output from a plurality of patches.

Figure 18:
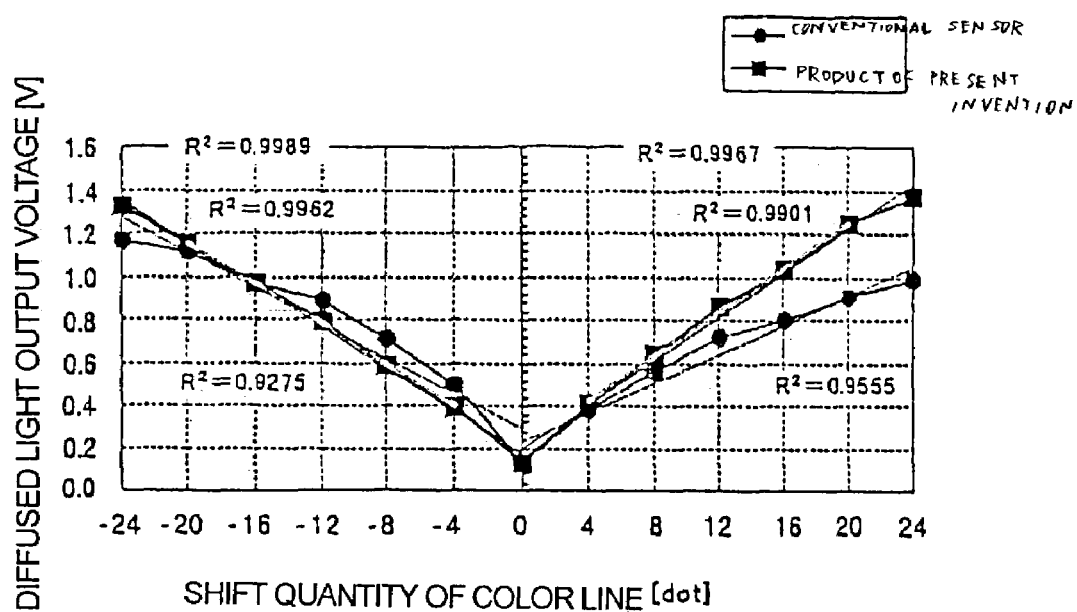
FIG. 18 is a graph that shows an improved effect of the linearity with respect to a conventional optical sensor.
Figure 45:
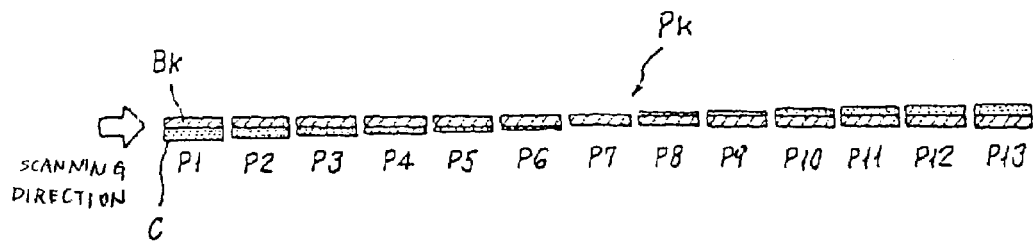
FIG. 45 is a schematic plan view that shows an alignment pattern formed by superposing two color lines.

In order to clearly show the effect of the alignment pattern detection sensor 40 in the embodiment with respect to the conventional sensor, comparison data obtained by comparing the result of detecting the alignment pattern Pk shown in FIG. 45 by the alignment pattern detection sensor 40 with the result thereof obtained by the conventional sensor is shown in FIG. 18.

It is seen that highly accurate detection of misalignment quantity becomes possible, since the coefficient of determination R2 of the approximate lines representing the linearity of two lines infinitely approaches to 1, by making the configuration of the alignment pattern detection sensor 40 as described above.

In order to compare the coefficients of determination of the approximate expression under the same conditions, R2 is obtained by using all data points on the negative side and all data points on the positive side in the lateral axis direction, with respect to the extreme value, in the approximate expression of the two lines. However, if the extreme value data is not used for the intersection calculation, due to the reason described above (thickening or thinning of the line), in the line on the left side of the minimal value, R2 becomes 0.9989, and in the line on the right side of the minimal value, R2 becomes 0.9967.

As described above, it is found that the linearity substantially equal to that of the two lines obtained from the observation result by the digital microscope equipped with a 2,000,000-pixel CCD shown in FIG. 20 (=the coefficient of determination R2 is substantially equal) is obtained.

As described above, the linearity is improved by the improvement in the alignment pattern detection sensor, and the linearity is further improved by excluding the extreme value data from the data points used for the intersection calculation. As a result, the number of data (that is, the number of patterns) used for the calculation of linear approximate expression can be reduced to as small as 2 in the respective lines (the number of patterns as a whole can be reduced to 4).

Therefore, the processing time for the misalignment adjusting operation that has no relation to the normal printing operation, that is, that does not contribute to the productivity, can be considerably reduced.

Even when such a sensor is used, highly accurate detection of misalignment quantity becomes possible. As a result, sufficient detection of misalignment quantity becomes possible by sampling using a sampling frequency as low as about $\frac{1}{100}$, with respect to the conventional edge detection method.

Figure 19:
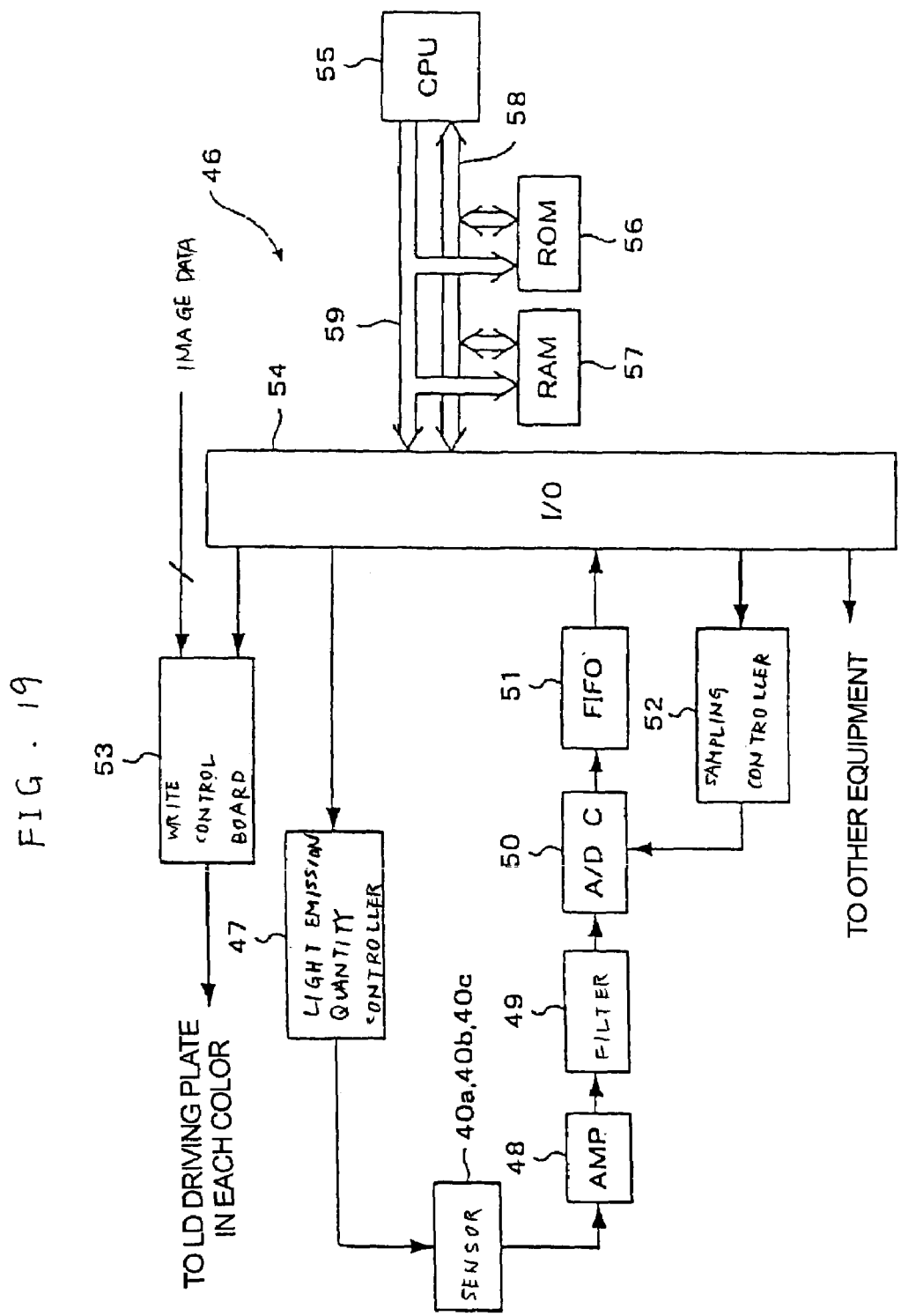
FIG. 19 is a block diagram of a misalignment quantity correction unit.

The misalignment correction by the alignment pattern detection sensor 40 and the method described above is carried out by a misalignment quantity correction unit. This misalignment quantity correction unit 46 is explained based on FIG. 19.

The light emitting quantity of the light emitting diode 40A, being the light emitting section in the alignment pattern detection sensors 40a, 40b, and 40c, is controlled by a light emission quantity controller 47, and the photodiode 40B on the output side is connected to an Input/Output (I/O) port 54 via an amplifier 48, a filter 49, an A/D converter 50, and an First In First Out (FIFO) memory 51.

The detection signals obtained from the alignment pattern detection sensors 40a, 40b, and 40c are amplified by the amplifier (AMP) 48, and having passed through the filter 49, are converted from analog data to digital data by the A/D converter 50.

Sampling of data is controlled by a sampling controller 52, and the sampled data is stored in the FIFO memory 51. The sampling controller 52 and a write control board 53 are connected to the I/O port 54.

The I/O port 54, CPU 55, ROM 56, and RAM 57 are connected with each other by a data bus 58 and an address bus 59.

Various programs including a program for calculating a misalignment quantity of the alignment pattern Pm are stored in the ROM 56. The program for calculating a misalignment quantity of the alignment pattern Pm includes such a condition that the extreme data is excluded from the data points used for the intersection calculation.

The ROM address, the RAM address, and various input and output equipment are specified by the address bus 59.

The CPU 55 monitors detection signals from the alignment pattern detection sensors 40a, 40b, and 40c at a predetermined timing, and controls the light emission quantity of the light emitting diode 40A by the light emission quantity controller 47, so that even if the light emitting diode 40A in the alignment pattern detection sensors 40a, 40b, and 40c deteriorates, detection of the alignment pattern Pm can be reliably performed, to thereby make the output level of the light receiving signal from the photodiode 40B constant at all times.

The CPU 55 also performs setting of the write control board 53, based on the correction quantity obtained from the detection result of the alignment pattern (including an alignment pattern for detecting a misalignment in the vertical scanning direction, described below), in order to change the angular frequency based on a change of a main resist and a sub-resist and a magnification error.

The write control board 53 includes a device that can set the output frequency very finely, for example, a clock generator or the like using a Voltage Controlled Oscillator (VCO), for each color including the reference color. The write control board 53 uses the output thereof as an image clock. The CPU 55 also controls a stepping motor for skew adjustment (not shown) in the optical write unit 16 based on the correction quantity obtained form the detection result of the alignment patterns.

The misalignment quantity correction unit 46 is constituted of the respective elements excluding the alignment pattern detection sensors 40a, 40b, and 40c. The main controller in the color printer can function as the misalignment quantity correction unit 46.

The misalignment adjusting operation by the misalignment quantity correction unit 46 is executed when any of the following conditions are met, (1) at the time of power on, (2) when a temperature change in the optical system is not smaller than a predetermined value (for example, 5 degree), or (3) at the time of finishing a job, when there is a print job for a certain number of sheets or more.

In a third embodiment, a general purpose side-view type element is selected from a standpoint that it is desired to construct a sensor unit of the alignment pattern detection sensor 40 at a cost as cheap as possible. However, when it is desired to make the light emission distribution or the light receiving sensitivity distribution in the light receiving plane uniform as much as possible, high linearity can be obtained in a wider range, for example, by selecting a chip type flat lens element having a wide area, and providing a collimate lens having a parallel light function over the whole face of the chip type element on the alignment pattern Pm side.

In the second embodiment, the alignment pattern for detecting a color misalignment in the horizontal scanning direction has been explained. When a color misalignment in the vertical scanning direction (in the same direction as the running direction of the transfer belt 18) is to be detected, an alignment pattern Ps as shown in FIG. 38 is formed on the transfer belt 18, in the same mode as that shown in FIG. 14.

The alignment pattern Ps is formed in the same manner as the alignment pattern Pm, by designating a plurality of lines formed by superposing the black line image Bk, being the reference color, on for example a cyan line image C as one patch, and continuously forming these patches with the relative position of two color line images shifted by an optional quantity.

A fourth embodiment of the present invention will be explained below.

This invention is also effective for the shape of the light receiving plane of a sensor having a configuration such that light is divided into P wave component and S wave component by using a beam splitter, and the arrangement of the sensors in the pattern scanning direction.

Figure 39:
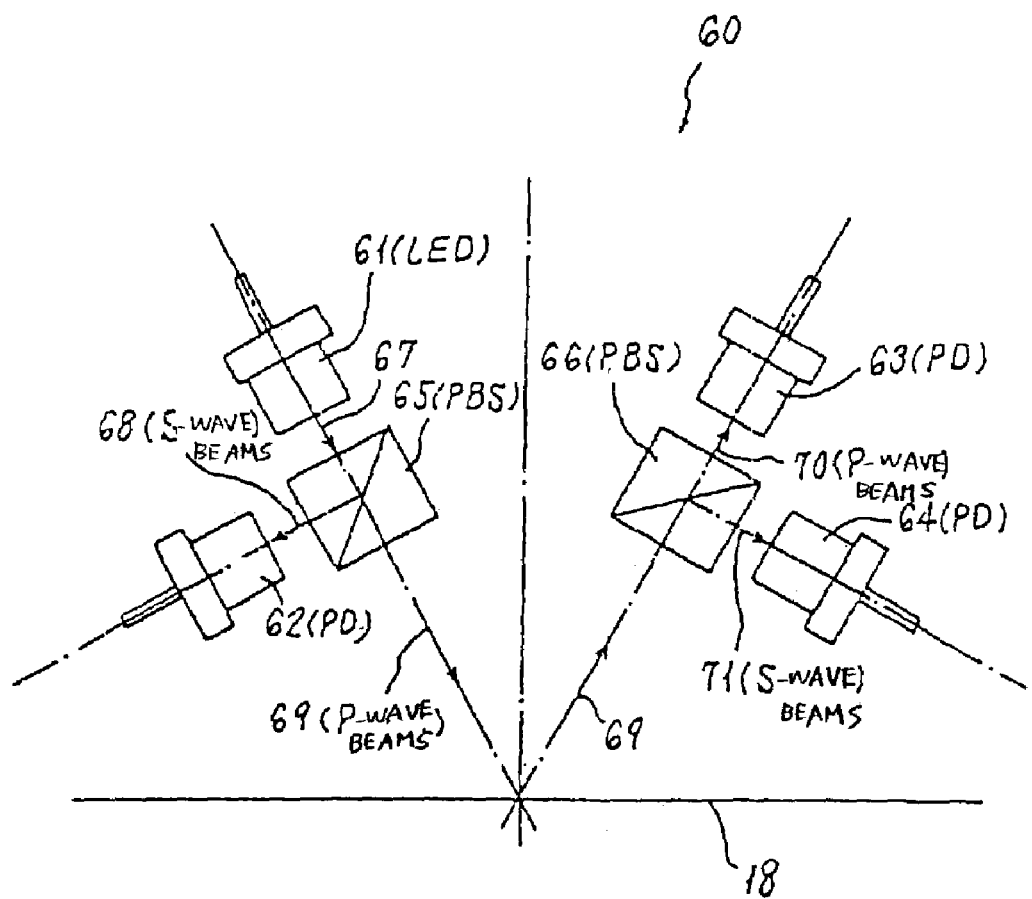
FIG. 39 shows the configuration of an alignment pattern detection sensor in a third embodiment.

One example thereof is explained with reference to FIG. 39. An alignment pattern detection sensor 60 as the alignment pattern detection unit in this embodiment has a light emitting diode (hereinafter referred to as LED) 61 as one light emitting section, photodiodes (hereinafter referred to as PD) 62, 63, 64 as three light receivers, and two polarizing beam splitters (hereinafter referred to as PBS) 65, and 66.

The polarized state of flood light 67 emitted from the LED 61 is random, but is divided into light components (S-wave beams) vibrating vertically with respect to the incident plane, and light components (P-wave beams) vibrating parallel with the incident plane, by the PBS 65. The S-wave beams 68 are reflected by the PBS 65 and enter the PD 62. The P-wave beams 69 transmit the PBS 65 and are cast to the alignment pattern on the transfer belt 18.

The polarized state of the P-wave beams 69 reflected by the alignment pattern becomes random due to irregular reflection, and the P-wave beams 69 are divided into P-wave beams 70 and S-wave beams 71 by the PBS 66. The P-wave beams 70 transmit the PBS 66 and enter the PD 63, and the S-wave beams 71 are reflected by the PBS 66 and enter the PD 64.

In the fourth embodiment, the PDs 62, 63, and 64 as light receivers receive diffused reflected component, not the diffused reflected light.

A fifth embodiment of the present invention will be explained below.

Figure 40:
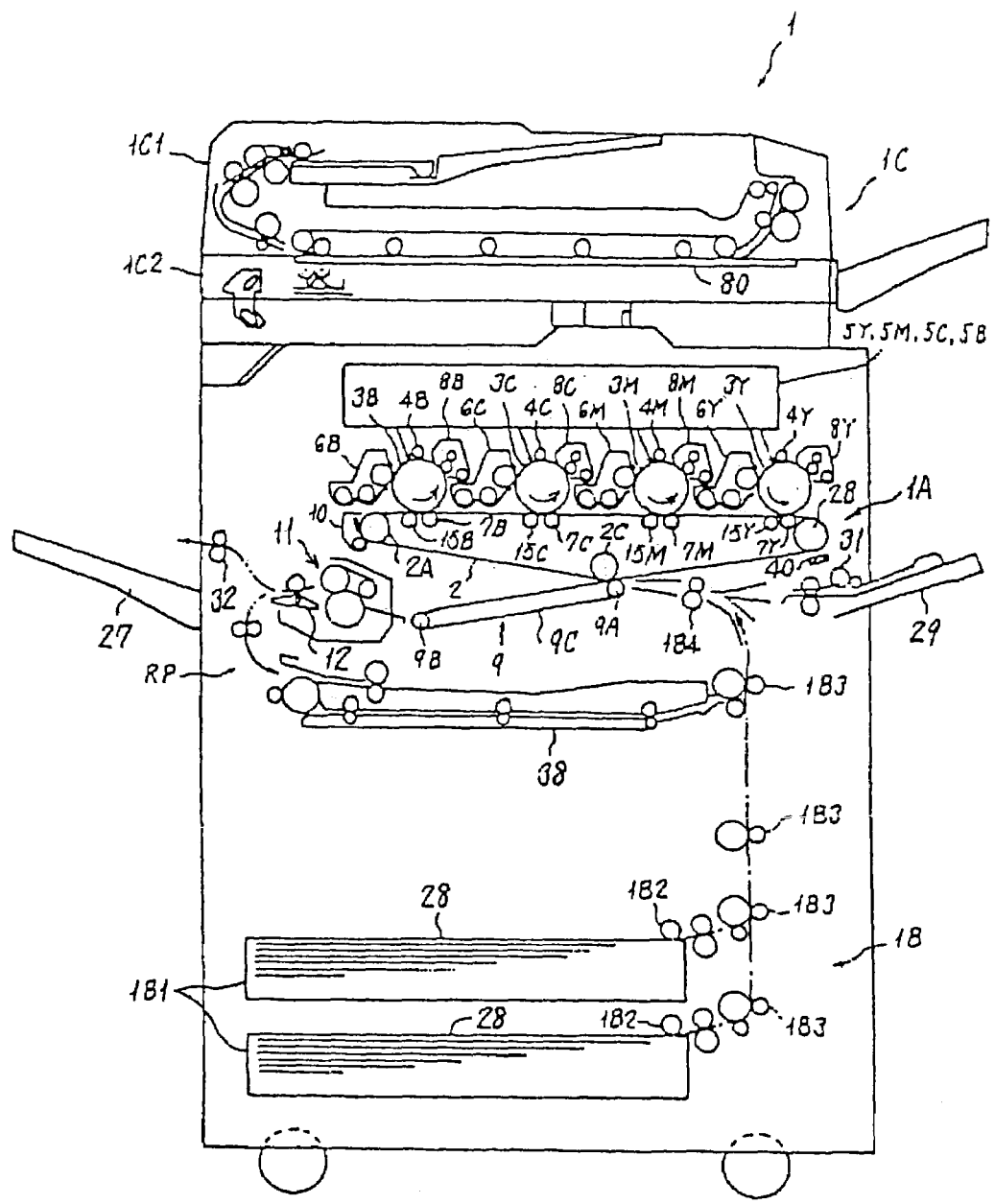
FIG. 40 is a schematic front view of a color copying machine as an image formation apparatus in a fifth embodiment.

In the second to fourth embodiments, application examples of the color image formation apparatus of a four-drum tandem direct transfer method are shown. However, as shown in FIG. 40, the present invention can be executed also in a color image formation apparatus of a type in which after an image is transferred onto an intermediate transfer body in the four-drum tandem configuration, the image is collectively transferred onto the transfer paper.

In the fifth embodiment, the alignment pattern Pm, Ps are formed on an intermediate transfer belt 2 as the intermediate transfer body, and this is detected by the alignment pattern detection sensor 40 arranged near a support roller 2B. The misalignment quantity correction unit is similar to that of the first embodiment.

The summary of the configuration and operation of a tandem type color copying machine as the image formation apparatus in this embodiment is explained below. The color copying machine 1 has an image formation section 1A located at the center of the apparatus body, a paper feed section 1B located below the image formation section 1A, and an image read section 1C located above the image formation section 1A.

The intermediate transfer belt 2 is arranged as a transfer body having a transfer plane extending horizontally, and a structure for forming an image having a complementary relation with a color-separated color is provided on the upper face of the intermediate transfer belt 2. In other words, photosensitive drums 3Y, 3M, 3C, and 3B, as image carriers that can carry images by toners of colors having the complementary relation (yellow, magenta, cyan, black), are arranged side by side, along the transfer plane of the intermediate transfer belt 2.

The respective photosensitive drums 3Y, 3M, 3C, and 3B are respectively formed of a drum rotatable in the same counterclockwise direction, and a charging apparatus 4 as a charging unit that executes the image forming processing in the rotation process, an optical write apparatus 5 as an exposure unit that forms an electrostatic latent image having a potential VL on the respective photosensitive drums 3Y, 3M, 3C, and 3B, based on the image information, a development apparatus 6 as a developing unit that develops the electrostatic latent image on the respective photosensitive drums 3 with a toner having the same polarity as that of the electrostatic latent image, a transfer bias roller 7 as a primary transfer unit, a voltage application member 15, and a cleaning apparatus 8 are arranged respectively around each photosensitive drum. The alphabet added to each reference sign respectively corresponds to the color of the toner, as in the photosensitive drum 3. The respective color toner is stored in each development apparatus 6.

The intermediate transfer belt 2 is spanned between a plurality of rollers 2A to 2C, and has a configuration capable of moving in the same direction at the position facing the photosensitive drums 3Y, 3M, 3C, and 3B. The roller 2C separate from the rollers 2A and 2B for supporting the transfer plane faces a secondary transfer apparatus 9 with the intermediate transfer belt 2 put therebetween. In the image formation section 1A in FIG. 40, reference sign 10 denotes a cleaning apparatus for the intermediate transfer belt 2.

The surface of the photosensitive drum 3Y is uniformly charged by the charging apparatus 4Y, and an electrostatic latent image is formed on the photosensitive drum 3Y based on the image information from the image read section 1C. The electrostatic latent image is visualized as a toner image by the development apparatus 6Y that stores the yellow toner, and the toner image is attracted by an electric field due to the voltage applied to the transfer bias roller 7Y and transferred onto the intermediate transfer belt 2, as a first transfer step.

The voltage application member 15Y is provided on the upstream side of the transfer bias roller 7Y in the rotation direction of the photosensitive drum 3Y. The voltage application member 15Y applies voltage having the same polarity as the charging polarity of the photosensitive drum 3Y and having a larger absolute value than VL in the solid portion, to prevent the toner from being transferred from the photosensitive drum 3Y to the intermediate transfer belt 2 before the toner image comes into the transfer area, to thereby prevent a disorder due to a toner scattering at the time of toner transfer from the photosensitive drum 3Y to the intermediate transfer belt 2.

In the other photosensitive drums 3M, 3C, and 3B, the similar image formation is performed, though the toner color is different, and the toner images of the respective colors are transferred sequentially onto the intermediate transfer belt 2 and superposed.

The toner remaining on the photosensitive drum 3 after the transfer is removed by the cleaning apparatus 8, and the potential of the photosensitive drum 3 is initialized by a discharging lamp (not shown) after the transfer, for the next image forming step.

The secondary transfer apparatus 9 has a transfer belt 9C spanned between a charging drive roller 9A and a driven roller 9B and moving in the same direction as that of the intermediate transfer belt 2. By charging the transfer belt 9C by the charging drive roller 9A, a multi-color image superposed on the intermediate transfer belt 2 or a single-color image carried thereon can be transferred onto the paper 28 as a transfer material.

The paper 28 is fed from the paper feed section 1B to the secondary transfer position. In the paper feed section 1B are provided a plurality of paper feed cassettes 1B1 in which the paper 28 is loaded and stored, a paper feed roller 1B2 that separates and feeds the paper 28 stored in the paper feed cassette 1B1 in order of from the uppermost paper one by one, a carrier roller pair 1B3, and a resist roller pair 1B4 located upstream of the secondary transfer position.

The paper 28 fed from the paper feed cassette 1B is once stopped by the resist roller pair 1B4, and fed to the secondary transfer position by the resist roller pair 1B4, with a skew displacement being corrected, at a timing that the front end of the toner image on the intermediate transfer belt 2 agrees with a predetermined position at the front end in the transport direction. A manual feed tray 29 is provided on the right side of the apparatus body so as to be brought up or down. The paper 28 stored in the manual feed tray 29 is fed toward the resist roller pair 1B4 by a carrier path joined with a paper carrier path from the paper feed cassette 1B1 fed by the paper feed roller 31.

In the optical write apparatus 5, the write beam is controlled by the image information from the image read section 1C or the image information output from a computer (not shown), and emitted to the photosensitive drums 3Y, 3M, 3C, and 3B corresponding to the image information, to thereby form an electrostatic latent image at a write density (=resolution) of 600 dpi.

The image read section 1C has an automatic document feeder 1C1, and a scanner 1C2 having a contact glass 80 as a document placing stand. The automatic document feeder 1C1 has a configuration such that the document sent out onto the contact glass 80 can be reversed, so that scanning on both sides of the document can be performed.

The electrostatic latent image on the photosensitive drum 3 formed by the optical write apparatus 5 is visualized by the two-component type (carrier and toner) development apparatus 6, and primarily transferred onto the intermediate transfer belt 2.

When the toner image in each color is transferred by superposition onto the intermediate transfer belt 2, secondary transfer is collectively performed onto the paper 28 by the secondary transfer apparatus 9. The secondarily transferred paper 28 is sent to a fixing apparatus 11, where an unfixed image is fixed thereon by heat and pressure. The residual toner on the intermediate transfer belt 2 after the secondary transfer is removed by the cleaning apparatus 10.

The paper 28 having passed the fixing apparatus 11 is selectively guided to a carrier path toward a feeder output tray 27 and a Reversing carrier Path RP, by a carrier path switching claw 12 provided downstream of the fixing apparatus 11. When carried toward the feeder output tray 27, the paper 28 is ejected onto the feeder output tray 27 by a paper ejecting roller pair 32, and stacked. When guided to the reversing carrier path RP, the paper 28 is reversed by a reversing apparatus 38, and then sent to the resist roller pair 1B4 again.

By the above configuration, in the color copying machine 1, an electrostatic latent image is formed with respect to the uniformly charged photosensitive drum 3, by exposing and scanning a document placed on the contact glass 80, or by the image information from a computer, and after the electrostatic latent image is visualized by the development apparatus 6, the toner image is primarily transferred onto the intermediate transfer belt 2.

The toner image transferred onto the intermediate transfer belt 2 is directly transferred onto the paper 28 sent out from the paper feed section 1B, when it is a single image. If it is a multi-color image, the toner images are superposed by repeating the primary transfer, and these images are secondarily transferred onto the paper 28 collectively.

On the paper 28 after the secondary transfer, an unfixed image is fixed by the fixing apparatus 11, and the paper 28 is ejected onto the paper output tray 27, or reversed and sent to the resist roller pair 1B4 again for forming images on both sides.

A sixth embodiment of the present invention will be explained below.

Figure 41:
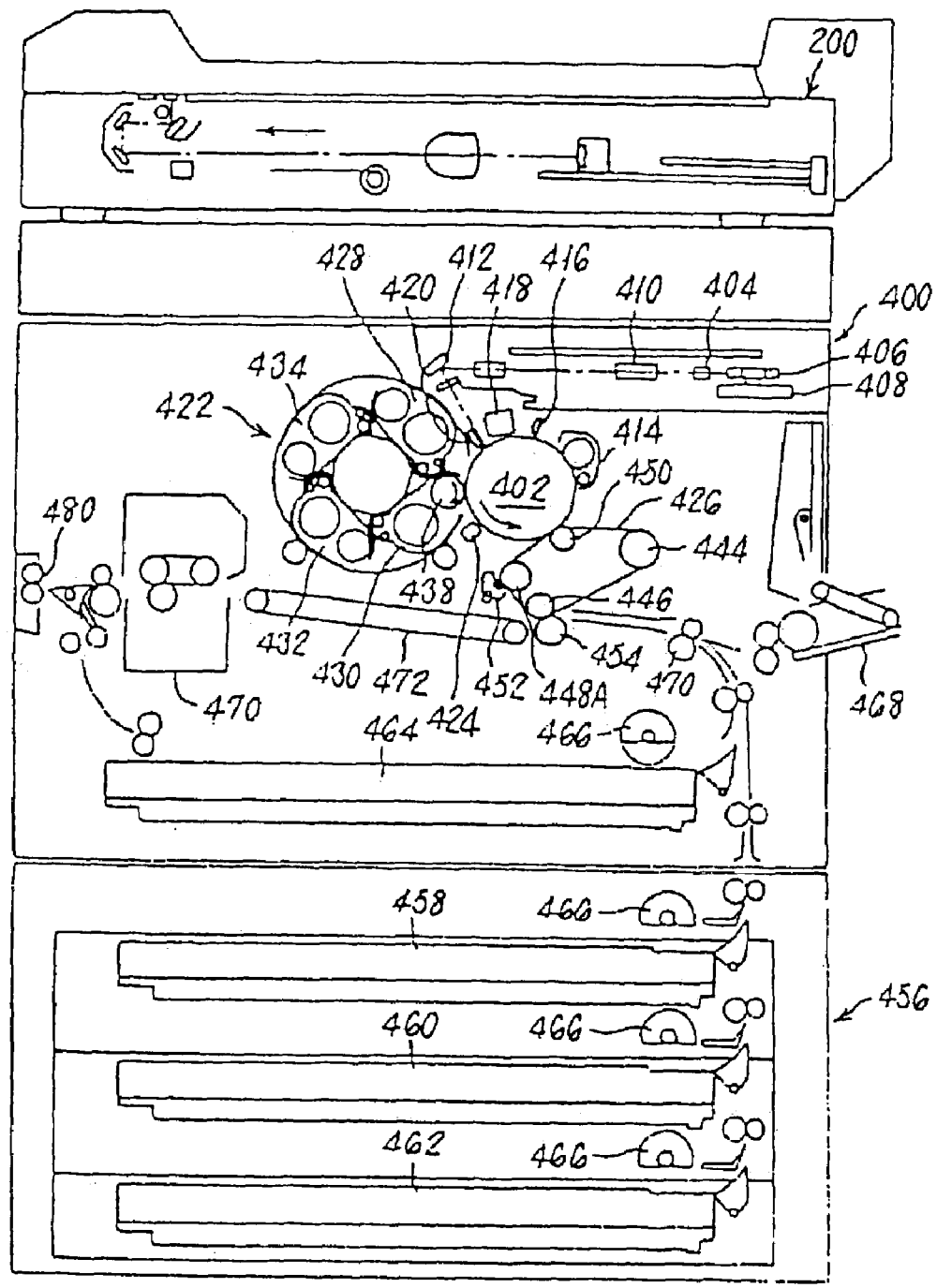
FIG. 41 is a schematic front view of a color copying machine as an image formation apparatus in a sixth embodiment.

This invention can be similarly executed in a color image formation apparatus of a type in which toner images in the respective colors are formed, using one photosensitive drum and a revolver type development apparatus, and after the respective toner images are transferred onto an intermediate transfer body by superposition, the toner images are collectively transferred onto the transfer paper as a sheet-form recording medium. One example thereof is shown in FIG. 41.

In the sixth embodiment, the alignment patterns Pm, Ps are formed on an intermediate transfer belt 426 as the intermediate transfer body, and these patterns are detected by the alignment pattern detection sensor 40 arranged near a drive roller 444. The misalignment quantity correction unit is the same as in the first embodiment.

The summary of the configuration of the color copying machine as the image formation apparatus in this embodiment is explained below.

In the color copying machine, an optical write unit 400 as an exposure unit converts the color image data from a color scanner 200 to optical signals and performs optical writing corresponding to the document image, to thereby form an electrostatic latent image on a photosensitive drum 402, being an image carrier.

The optical write unit 400 comprises a laser diode 404, a polygon mirror 406, a rotation motor 408 for the mirror 406, an f/θ lens 410, a reflection mirror 412, and the like.

The photosensitive drum 402 is rotated in the counter-clockwise direction as shown by an arrow, and a photosensitive drum cleaning unit 414, a discharging lamp 416, a potential sensor 420, a developing device selected from a rotary development apparatus 422, a developing density pattern detector 424, and the intermediate transfer belt 426 as the intermediate transfer body are arranged around the photosensitive drum 402.

The rotary development apparatus 422 has a black developing device 428, a cyan developing device 430, a magenta developing device 432, a yellow developing device 434, and a rotation driving section (not shown) that rotates the respective developing devices. The respective developing devices have the similar configuration as the development apparatus 4 shown in the above embodiment. The conditions and specification for the magnetic carrier are the same.

In the standby state, the rotary development apparatus 422 is set at the position for black development, and when the copying operation is started, read of the black image data is started at a predetermined timing by the color scanner 200, and based on the image data, optical writing by the laser beam and formation of an electrostatic latent image (black latent image) are initiated.

Before the front end of the latent image reaches the development position of the black developing device 428, a developing sleeve is rotated, to develop the black latent image by the black toner, in order to develop from the front end of the black latent image. A toner image having a negative polarity is formed on the photosensitive drum 402.

Thereafter, the developing operation in the area of the black latent image is continued, but when the rear end of the latent image has passed the black developing position, the rotary development apparatus 422 is promptly rotated from the developing position for the black to the developing position for the next color. This operation is completed at least before the front end of the latent image by the next image data arrives.

When the image forming cycle is started, at first, the photosensitive drum 402 is rotated in the counterclockwise direction as shown by the arrow, and the intermediate transfer belt 426 is rotated in the clockwise direction, by a drive motor (not shown). With the rotation of the intermediate transfer belt 426, the black toner image formation, the cyan toner image formation, the magenta toner image formation, and the yellow toner image formation are carried out, and finally, the toner images are superposed on the intermediate transfer belt 426 (primary transfer), in order of black (Bk), cyan (C), magenta (M), and yellow (Y), thereby a toner image is formed.

The intermediate transfer belt 426 is laid across in a tensioned condition between respective support members, that is, a primary transfer electrode roller 450 facing the photosensitive drum 402, the drive roller 444, a secondary transfer facing roller 446 facing the secondary transfer roller 454, and a cleaning facing roller 448A facing the cleaning unit 452 that cleans the surface of the intermediate transfer belt 426, and is drive-controlled by a drive motor (not shown).

The respective toner images of black, cyan, magenta, and yellow sequentially formed on the photosensitive drum 402 are accurately registered in order on the intermediate transfer belt 426, thereby a belt transfer image superposed in four colors is formed. This belt transfer image is collectively transferred onto the paper by the secondary transfer facing roller 446.

Paper in various sizes having a different size from that of the paper stored in the cassette 464 in the apparatus body is stored in various recording paper cassettes 458, 460, and 462 in a feed paper bank 456, and of these, size-specified paper is fed and carried from the cassette storing the specified paper toward the resist roller pair 470 by a paper feed roller 466. In FIG. 41, reference sign 468 denotes a manual feed tray for Over Head Projector (OHP) paper, thick paper, and the like.

When the image formation is initiated, the paper is fed from a feeding port of any cassette, and stands by at a nip portion of the resist roller pair 470. The resist roller pair 470 is driven so that when the front end of the toner image on the intermediate transfer belt 426 approaches the secondary transfer facing roller 446, the front end of the paper coincides with the front end of the image, to thereby perform resist alignment between the paper and the image.

In this manner, the paper is superposed on the intermediate transfer belt 426, and passes under the secondary transfer facing roller 446, to which a voltage having the same polarity as that of the toner is applied. At this time, the toner image is transferred onto the paper. Subsequently, the paper is discharged, and separated from the intermediate transfer belt 426, and shifted to the paper carrier belt 472.

The paper on which four-color superposed toner image is collectively transferred from the intermediate transfer belt 426 is carried to the belt fixing type fixing apparatus 470 by the paper carrier belt 472, and a toner image is fixed on the paper by the fixing apparatus 470, using heat and pressure. The paper after completing fixation, is ejected to the outside of the apparatus by an ejection roller pair 480, and stacked in a tray (not shown). As a result, a full color copy is obtained.

A seventh embodiment of the present invention will be explained below.

The alignment pattern detection sensor described above in the present invention is applicable to any image formation apparatus that detects misalignment quantity and performs correction, by detecting an alignment pattern formed by forming a plurality of two-color superposed patches. Hence, it is also applicable as a misalignment detection sensor of an ink jet apparatus.

Figure 42:
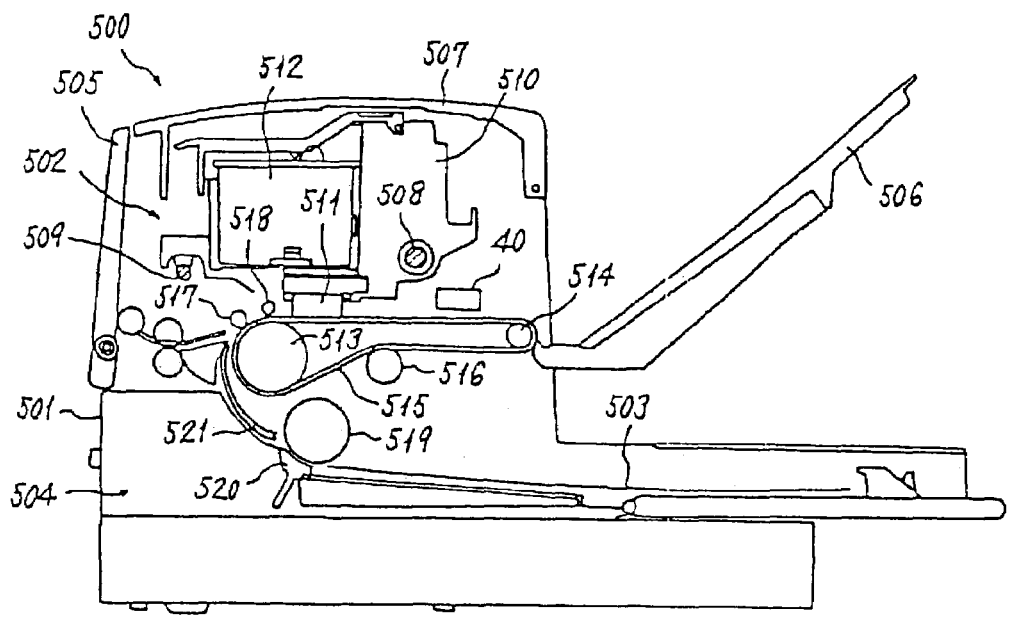
FIG. 42 is a schematic front view of an ink jet recorder as an image formation apparatus in a seventh embodiment.
Figure 43:
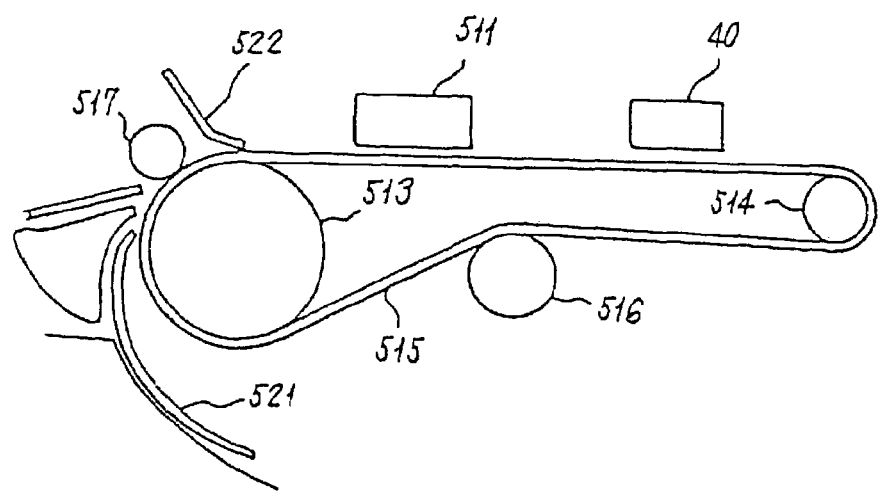
FIG. 43 is an enlarged diagram that shows the vicinity of a carrier belt in FIG. 42.
Figure 44:
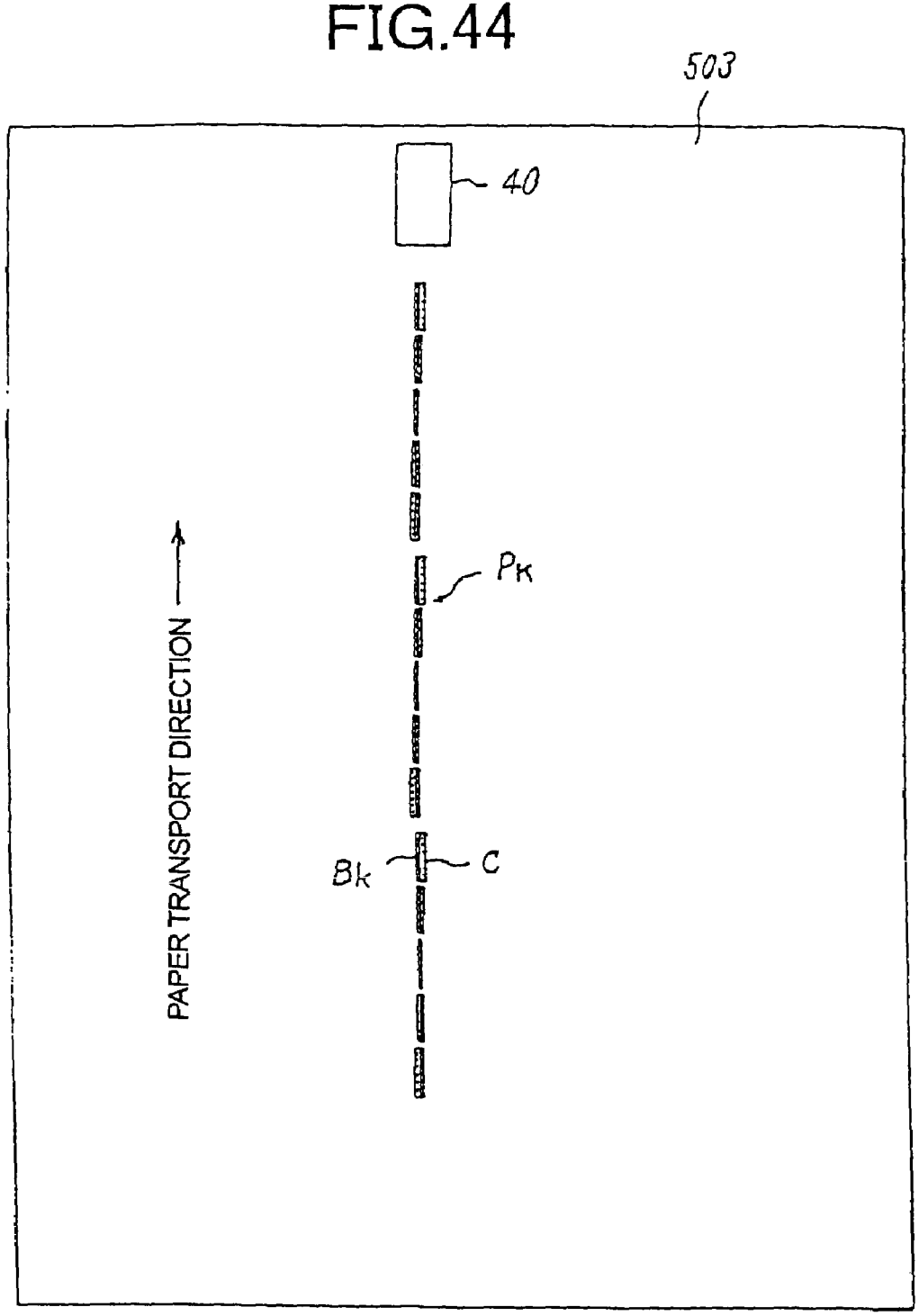
FIG. 44 is a schematic plan view that shows the position of the formation of the alignment pattern and the alignment pattern detection sensor in the ink jet recorder.

One example thereof is explained based on FIG. 42 to FIG. 44.

The schematic configuration and printing function of an ink jet recorder 500 as an image formation apparatus is explained based on FIG. 42. The ink jet recorder 500 has a printing mechanism section 502 comprising a carriage movable in the horizontal scanning direction, a recording head comprising an ink jet head mounted on the carriage, an ink cartridge for supplying ink to the recording head, and the like, inside the apparatus body 501.

A paper feed cassette 504 that can load and store paper 503 as a sheet-form recording medium is provided in the lower part of the apparatus body 501, and the paper feed cassette 504 is detachably provided with respect to the apparatus body 501 from the front side (from left side in the figure).

A manual feed tray 505 is provided on the front face of the apparatus body 501 so as to be freely opened or closed, so that the paper 503 fed from the paper feed cassette 504 or the manual feed tray 505 is carried, and after a predetermined image is recorded thereon by the printing mechanism section 502, the paper 503 is ejected to a feeder output tray 506 provided at the backside of the apparatus body 501. An upper cover 507 is provided on the upper face of the apparatus body 501 so as to be freely opened or closed.

In the printing mechanism section 502, the carriage 510 is swingably held by a main guide rod 508 and a sub-guide rod 509 supported between right and left side plates (not shown) so as to be able to slide in the horizontal scanning direction (vertically on the face of paper), and the recording head 511 comprising an ink jet head having nozzles for discharging ink drops for the respective colors of yellow (Y), cyan (C), magenta (M), and black (Bk) is provided on the lower side of the carriage 510. Respective ink cartridges 512 for supplying the ink of the respective colors to the recording head 511 are provided on the upper side of the carriage 510, so as to be able to be replaced.

The recording head 511 may be one in which a plurality of heads for discharging ink drops in each color is arranged in the horizontal scanning direction, or one in which one head having nozzles for discharging ink drops in each color is used.

Below the recording head 511, a carrier belt 515 that electrostatically attracts and carries the paper 503 is spanned between a carrier roller 513 and a driven roller 514, in order to carry the paper 503 in the vertical scanning direction with respect to the printing position by the recording head 511. Tension is given to the carrier belt 515 by an intermediate roller 516.

At a position facing the carrier roller 513, with the carrier belt 515 put therebetween, a bias roller 517 for charging the carrier belt 515 is arranged. A press roller 518 for pressing the paper 503 toward the carrier belt 515 is arranged near a starting point of a plane of the carrier belt 515. Here, the starting point of a plane of the carrier belt 515 means the upstream in the paper transport direction of a portion where the carrier belt 515 becomes parallel with the recording head 511, on the recording head 511 side of the carrier belt 515, specifically, a portion where the carrier belt 515 is away from the carrier roller 513.

The paper 503 stored in the paper feed cassette 504 is separated one by one in order of the uppermost paper by the paper feed roller 519 and a friction pad 520, and carried by a curved guide member 521 toward a nip portion of the bias roller 517 and the carrier belt 515.

The alignment pattern detection sensor 40 that detects the alignment pattern Pm formed on the paper 503 is provided above the carrier belt 515, downstream in the paper transport direction. The misalignment quantity correction unit is the same as in the first embodiment.

FIG. 43 is an enlarged diagram that shows the vicinity of the carrier belt 515. A plate-form suppressing member 522 may be provided instead of the press roller 518 shown in FIG. 42.

As shown in FIG. 44, for example, the alignment pattern Pk as shown in FIG. 45 is formed on the paper 503, as a transfer body on which the alignment pattern is formed, and this pattern is detected by the alignment pattern detection sensor 40, to thereby correct the color misalignment.

As explained above, according to one aspect of the present invention, a pattern is prepared as one patch, and the pattern is obtained by superposing a reference pattern on a color pattern to be corrected. The reference pattern is obtained by forming a plurality of lines at a predetermined pitch by the black toner as the reference color that is the last color to be superposed on any of color patterns, and the color pattern is obtained by forming a plurality of lines by a color toner at an equal pitch to the pitch in the reference pattern. A plurality of patches are arranged on the transfer belt as an intermediate transfer body along a movement direction thereof. Each of the patches is such that positions of the lines in the color pattern with respect to the lines in the reference pattern are shifted by an optional quantity in a pitch direction of the lines. Either one of a patch in which the color pattern to be corrected is completely superposed by the reference pattern and a patch in which the color pattern to be corrected is completely displaced from the reference pattern is selected as a reference patch. Therefore, it is possible to form a correction pattern allowing highly accurate color misalignment detection.

According to another aspect of this invention, an intersection point of two approximate lines as outputs is calculated. The outputs are obtained on opposite sides of an inflection point of the optically detected values, with respect to each optional shift quantity of the patches, of the respective patches of the continuously formed patch group in the formed correction pattern. The detected values excluding a minimum value and a maximum value are used for performing color misalignment correction based on the coordinates of such an intersection point, and therefore the intersection point can be calculated by more accurate approximate lines. Thus, it is possible to perform highly accurate misalignment correction.

Moreover, the detection sensor has a regular reflected light output, the detection start timing of the diffused light output in each patch of the detection sensor is determined based on a trailing timing of the regular reflected light, and a predetermined number of sampling is carried out at a predetermined sampling period after a predetermined period of time passes, to thereby perform color misalignment correction by designating the output mean value as a sensor detection value in each patch. Thus, it is possible to perform highly accurate misalignment correction.

According to still another aspect of this invention, it is possible to provide the color image formation apparatus that can carry out highly accurate misalignment correction.

Furthermore, it is possible to provide the color image formation apparatus that can carry out highly accurate misalignment correction, since each patch length, patch interval, and spot diameter on a transfer body of the detection sensor have a relation of patch length+patch interval>spot diameter on the transfer body of the sensor×2.

Moreover, the toner image is formed by a one-component development apparatus, thereby it is possible to provide the color image formation apparatus that can carry out highly accurate misalignment correction.

According to still another aspect of this invention, the alignment pattern detection sensor emits light from the light emitting unit to an alignment pattern formed by superposing the reference color image on an image of a color other than the reference color, and detects the reflected light from the alignment pattern by the light receiver. The light receiver is configured so as to detect diffused reflected light or diffused reflected component of the reflected light. The light emitting unit and the light receiver are arranged along the scanning direction of the alignment pattern. The spot shape of at least the light receiver is set such that an area increase corresponding to the shift quantity of the color, other than the reference color, with respect to the reference color at a different position of the alignment pattern becomes constant. Therefore, a nonlinear factor of two lines with respect to the shift quantity of the color other than the reference color with respect to the reference color can be eliminated. As a result, highly accurate alignment pattern detection can be performed, without using an expensive sensor.

Furthermore, the alignment pattern detection sensor emits light from the light emitting unit to an alignment pattern and detects the reflected light from the alignment pattern by the light receiver. The alignment pattern is obtained by forming a plurality of lines by superposing the black line image as a reference color on a line image of a color other than the reference color as one patch, and continuously forming these patches each in which positions of the lines in the color line image are shifted with respect to the black lines in the black line image by an optional quantity. The light receiver is configured so as to detect diffused reflected light or diffused reflected component of the reflected light. The light emitting unit and the light receiver are arranged along the scanning direction of the alignment pattern. The spot shape of at least the light receiver is set such that an increase in an area becomes constant. The increase corresponds to the shift quantity of the color line image with respect to the black line image at a different position of the alignment pattern. Therefore, a nonlinear factor of two lines in the shift quantity of the color line image with respect to the black line image can be eliminated. As a result, highly accurate alignment pattern detection can be performed without using an expensive sensor.

Moreover, the spot shape of the light receiver is made square. Therefore, an area increase corresponding to the shift quantity of a color other than the reference color with respect to the reference color becomes reliably constant, and as a result, highly accurate alignment pattern detection can be performed.

Furthermore, the central axes in directional characteristics of the light emitting unit and the light receiver agree with the scanning direction of the alignment pattern. As a result, the linearity of two lines can be further increased, thereby enabling a further increase in the accuracy of the alignment pattern detection.

Moreover, the light emitting unit is formed of a light emitting diode, and the light receiver is formed of a photodiode or a phototransistor. As a result, a nonlinear factor caused by the characteristic of an element itself can be reduced, thereby enabling further improvement in the linearity of two lines.

Furthermore, the light receiver is a photoreceptor having a wide directional angle. As a result, a nonlinear factor caused by the characteristic of an element itself can be reduced, thereby enabling further improvement in the linearity of two lines.

Moreover, at least one of the light emitting section and the light receiver is an element having a half-value angle of at least 30°. As a result, a nonlinear factor caused by the characteristic of an element itself can be reduced, thereby enabling further improvement in the linearity of two lines.

Furthermore, at least one of the light emitting section and the light receiver is a side view type element. As a result, a nonlinear factor caused by the characteristic of an element itself can be reduced, thereby enabling further improvement in the linearity of two lines.

Moreover, at least one of the light emitting section and the light receiver is a chip type element. As a result, a nonlinear factor caused by the characteristic of an element itself can be reduced, thereby enabling further improvement in the linearity of two lines.

Furthermore, a collimator lens is provided between the chip type element and the alignment pattern to be detected. As a result, a nonlinear factor caused by the characteristic of an element itself can be reduced, thereby enabling further improvement in the linearity of two lines.

According to still another aspect of this invention, the image formation apparatus has a plurality of image carriers and obtains a color image by sequentially and superposedly transferring toner images formed on the image carriers onto the transfer body, and then collectively transferring the images onto a sheet-form recording medium. The image formation apparatus further comprises an alignment pattern formed by superposing the reference color image and an image of a color other than the reference color, an alignment pattern detection unit that detects the alignment pattern, and a misalignment quantity correction unit that determines a misalignment quantity between the reference color image and the color image and a direction of the misalignment, based on an output signal from the alignment pattern detection unit, and corrects the misalignment quantity. The alignment pattern detection unit is the alignment pattern detection sensor. As a result, highly accurate detection becomes possible even with a sampling frequency as low as about 1/100, as compared with the conventional edge detection method.

Since it is not necessary to have a high speed processing circuit after the sampling processing, the electric hardware configuration can be obtained at a considerably low cost.

Since the linearity of two lines with respect to an optional shift quantity of the color line can be considerably improved, a number of patches constituting the alignment pattern can be considerably reduced.

Since the processing time required for adjustment having no relation to the normal printing, such as misalignment adjustment, can be considerably reduced, the productivity can be substantially improved.

Since the detection method is a method using diffused light, in which the detection performance is not affected by deterioration due to wear of the transfer body (alignment pattern carrier) such as a transfer belt, detection accuracy equal to that of the edge detection method using the regular reflected light can be obtained. Further, this detection method can largely contribute to a longer life of the alignment pattern carrier such as a belt, that is, to reduction of the running cost.

Furthermore, the image formation apparatus has a plurality of image carriers and obtains a color image by sequentially and superposedly transferring toner images formed on the image carriers onto the transfer body, and then collectively transferring the images onto a sheet-form recording medium. The image formation apparatus further comprises the alignment pattern obtained by designating a plurality of lines formed by superposing a line image of black as the reference color on a line image of a color other than the reference color as one patch, and continuously forming patches each in which positions of the color lines are shifted with respect to the black lines by an optional quantity. The image formation apparatus further comprises the alignment pattern detection unit that detects the alignment pattern, and the misalignment quantity correction unit that determines a misalignment quantity between the black line image and the color line image and a direction of the misalignment, based on an output signal from the alignment pattern detection unit, and corrects the misalignment quantity. The alignment pattern detection unit is the pattern detection sensor. As a result, the effect similar to that of the invention described above can be obtained.

Moreover, since the imaging order of the line images, the black color as the reference color is the last color in color superposition on the transfer body, high signal-to-noise (SN) ratio can be obtained, thereby enabling improvement in the detection accuracy.

Furthermore, an output signal from the alignment pattern detection unit corresponding to an optional shift quantity of a line image of a color other than the reference color, with respect to the reference color line image in the alignment pattern, has at least one extreme value. When the optional shift quantity is plotted on the lateral axis, the misalignment quantity correction unit determines a misalignment quantity of a color other than the reference color with respect to the reference color and a direction of the misalignment, by calculating an intersection point of two lines formed on the opposite sides of the extreme value. The extreme value or data points near the extreme value are not used when the intersection point is calculated. As a result, the linearity of the approximate line can be increased, regardless of the forming state of the alignment pattern, and hence the misalignment detection accuracy can be improved.

Moreover, the image formation apparatus has a two-component type development apparatus. Since line thickening or line thinning is likely to occur in forming the alignment pattern, an effect of improving the misalignment detection accuracy can be exhibited by further increasing the linearity of the approximate line.

Furthermore, the brightness L* of the transfer body, on which the alignment pattern is formed, is not higher than 40, and preferably, not higher than 20. As a result, high SN ratio can be obtained, thereby enabling improvement in the detection accuracy.

According to still another aspect of this invention, the image formation apparatus has a plurality of image carriers and obtains a color image by sequentially and superposedly transferring toner images formed on the image carriers onto a sheet-form recording medium supported on the transfer body. The image formation apparatus further comprises the alignment pattern formed by superposing a reference color image on an image of a color other than the reference color, the alignment pattern detection unit that detects the alignment pattern, and the misalignment quantity correction unit that determines a misalignment quantity between the reference color image and the color image and a direction of the misalignment, based on an output signal from the alignment pattern detection unit, and corrects the misalignment quantity. The alignment pattern detection unit is the alignment pattern detection sensor. As a result, the effect similar to that of the invention as described above can be obtained.

Furthermore, since the alignment pattern, in which patches obtained by superposing the black line image as the reference color on the color line image are continuously formed, is used, the similar effect to that in the invention as described above can be obtained.

Moreover, in the imaging order of the line images, the black color is the last color in color superposition on the transfer body. As a result, high SN ratio can be obtained, thereby enabling improvement in the detection accuracy.

Furthermore, an output signal from the alignment pattern detection unit corresponding to an optional shift quantity of the line image of a color other than the reference color with respect to the reference color line image in the alignment pattern, has at least one extreme value. When the optional shift quantity is plotted on the lateral axis, the misalignment quantity correction unit determines a misalignment quantity of the color other than the reference color and a direction of the misalignment, by calculating an intersection point of two lines formed on the opposite sides of the extreme value. The extreme value or data points near the extreme value are not used when the intersection point is calculated. As a result, the linearity of the approximate line can be increased regardless of the forming state of the alignment pattern, and hence the misalignment detection accuracy can be improved.

Moreover, the image formation apparatus has a two-component type development apparatus. Since line thickening or line thinning is likely to occur in forming the alignment pattern, an effect of improving the misalignment detection accuracy can be exhibited, by further increasing the linearity of the approximate line.

Furthermore, the brightness L* of the transfer body, on which the alignment pattern is formed, is not higher than 40, and preferably, not higher than 20. As a result, high SN ratio can be obtained, thereby enabling improvement in the detection accuracy.

According to still another aspect of this invention, the image formation apparatus that obtains a color image by an ink jet method, comprises the alignment pattern formed by superposing the reference color image on an image of a color other than the reference color, the alignment pattern detection unit that detects the alignment pattern, and the misalignment quantity correction unit that determines a misalignment quantity between the reference color image and the color image and a direction of the misalignment, based on an output signal from the alignment pattern detection unit, and corrects the misalignment quantity. The alignment pattern detection unit is the alignment pattern detection sensor. As a result, the effect similar to that in the invention as described above can be obtained.

Furthermore, the image formation apparatus that obtains a color image by an ink jet method, comprises the alignment pattern obtained by designating a plurality of lines formed by superposing the black line image as the reference color on a line image of a color other than the reference color, as one patch, and continuously forming a plurality of patches each in which positions of the lines in the color line image are shifted with respect to the black lines in the black line image by an optional quantity. The mage formation apparatus also comprises the alignment pattern detection unit that detects the alignment pattern, and the misalignment quantity correction unit that determines a misalignment quantity between the reference color image and the color image and a direction of the misalignment, based on an output signal from the alignment pattern detection unit, and corrects the misalignment quantity. The alignment pattern detection unit is the alignment pattern detection sensor. As a result, the effect similar to that of the invention as described above can be obtained.

According to still another aspect of this invention, in the color alignment detection method, an alignment pattern formed by superposing the reference color image on an image of a color other than the reference color is detected by the alignment pattern detection unit, and a misalignment quantity between the reference color image and the color image and a direction of the misalignment are determined based on the output signal from the alignment pattern detection unit. The alignment pattern detection unit detects the diffused reflected light or diffused reflected component, and the light emitting unit and the light receiver of the alignment pattern detection unit are arranged along the scanning direction of the alignment pattern. The spot shape of at least the light receiver is set such that an area increase corresponding to the shift quantity of the color other than the reference color with respect the reference color at a different position of the alignment pattern, becomes constant. Therefore, a nonlinear factor of two lines in the shift quantity of the color other than the reference color with respect to the reference color, can be eliminated. As a result, highly accurate alignment pattern detection can be performed without using an expensive sensor.

Furthermore, the correlation between brightness of an object to be detected, on which the alignment pattern is formed, and diffused reflected light is experimentally obtained, and an appropriate value is determined from obtained data, and the brightness of the object to be detected Is set based on the appropriate value. As a result, high SN ratio can be obtained, and detection accuracy can be improved.

Moreover, the reference color of the alignment pattern and the output characteristics relating to the brightness of the object to be detected are made substantially equivalent. As a result, high SN ratio can be obtained, and detection accuracy can be improved.

According to still another aspect of this invention, in the color misalignment correction method, an intersection point of two lines formed on the opposite sides of an extreme value in an output signal is calculated by the misalignment quantity correction unit, based on the output signal from the alignment pattern detection unit corresponding to an optional shift quantity of a color line image with respect to the reference color line image in the alignment pattern. Thereby, a misalignment quantity between the reference color and the color other than the reference color and a direction of the misalignment are determined, and the misalignment is corrected. When the intersection point of the two lines are calculated, the extreme value or data points near the extreme value are not used. As a result, the linearity of the approximate line can be further increased regardless of the forming state of the alignment pattern, and misalignment detection accuracy can be improved.

According to still another aspect of this invention, in the color misalignment correction method, an intersection point of two lines formed on the opposite sides of an extreme value in an output signal is calculated by the misalignment quantity correction unit based on the output signal from the alignment pattern detection unit corresponding to an optional shift quantity of the color line image with respect to the reference color line image in the alignment pattern. Thereby, a misalignment quantity between the reference color and the color other than the reference color and a direction of the misalignment are determined, and the misalignment is corrected. The light emitting unit and the light receiver in the alignment pattern detection unit are arranged so as to correct the non-linearity of the two lines. As a result, the misalignment quantity detection accuracy can be improved.

The present document incorporates by reference the entire contents of Japanese priority documents, 2002-082421 filed in Japan on Mar. 25, 2002 and 2002-346007 filed in Japan on Nov. 28, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A misalignment correction pattern formation method for forming a plurality of color images on a transfer belt to form a multi-color image and correcting a misalignment of each color using a detection sensor, the method comprising:
   preparing a reference pattern with a plurality of lines formed by a black color as a reference color, the reference pattern having a predetermined pitch between the lines;
   preparing a color pattern to be corrected with a plurality of lines formed by a color toner, the color pattern having an equal pitch to the pitch in the reference pattern;
   forming a patch by superposing the reference pattern as a last color to be superposed on the color pattern;
   preparing a plurality of patches each in which a position of the lines in the color pattern with respect to the lines in the reference pattern is shifted by a shift quantity in a pitch direction of the lines;
   arranging the plurality of patches on the transfer belt along a movement direction thereof;
   selecting as a reference patch, either one of a patch in which the color pattern to be corrected is completely superposed by the reference pattern and a patch in which the color pattern to be corrected is completely displaced from the reference pattern; and
   forming a continuously formed patch group including the reference patch and the patches as a misalignment correction pattern.

2. The misalignment correction pattern formation method according to claim 1, wherein step of arranging the plurality of patches includes arranging the plurality of patches on the transfer belt that is black in color.

3. A misalignment correction method for forming a plurality of color images on a transfer belt to form a multi-color image and correcting a misalignment of each color using a detection sensor, the method comprising:
   preparing a reference pattern with a plurality of lines formed by a black color as a reference color, the reference pattern having a predetermined pitch between the lines;
   preparing a color pattern to be corrected with a plurality of lines formed by a color toner, the color pattern having an equal pitch to the pitch in the reference pattern;
   forming a patch by superposing the reference pattern as a last color to be superposed on the color pattern;
   preparing a plurality of patches each in which a position of the lines in the color pattern with respect to the lines in the reference pattern is shifted by a shift quantity in a pitch direction of the lines;
   arranging the plurality of patches on the transfer belt along a movement direction thereof;
   selecting as a reference patch, either one of a patch in which the color pattern to be corrected is completely superposed by the reference pattern and a patch in which the color pattern to be corrected is completely displaced from the reference pattern;
   forming a continuously formed patch group including the reference patch and the patches as a correction pattern;
   optically detecting a value of each of the patches with respect to the shift quantity of the respective patches of the continuously formed patch group in the correction pattern;
   calculating an intersection point of two approximate lines as output obtained on opposite sides of an inflection point of the two lines, by using the detected values excluding a minimum value and a maximum value; and
   performing misalignment correction based on the intersection point.

4. The misalignment correction method according to claim 3, wherein the step of optically detecting the value includes optically detecting the value using the detection sensor, which includes a regular reflected light output, wherein a trailing timing of the regular reflected light is used for a detection start timing of a diffused light output of each of the patches by the detection sensor, as a reference, and a predetermined number of sampling is carried out at a predetermined sampling period after a predetermined period of time passes, to thereby perform misalignment correction by designating a mean value of the outputs as a sensor detection value of each of the patches.

5. The misalignment correction method according to claim 3, wherein the step of arranging the plurality of patches includes arranging the plurality of patches on the transfer belt that is black in color.

6. The misalignment correction method according to claim 3, wherein
   the optically detecting includes detecting either one of a diffused reflected light and a diffused reflected component from the alignment pattern,
   the method further comprising
   determining a misalignment quantity between the reference color image and the color image and a direction of the misalignment based on an output signal according to either one of the detected diffused reflected light and diffused reflected component, wherein
   the performing misalignment correction includes performing misalignment correction based on the misalignment quantity determined at the determining.

7. The misalignment correction method according to claim 3, further comprising:
   detecting a brightness value from a correlation between a brightness of an object to be detected, on which the alignment pattern is formed, and the diffused reflected light, and setting the brightness of the object to be detected based on the brightness detected at the detecting.

8. The misalignment correction method according to claim 3, further comprising:

making substantially equivalent to each other the reference color of the alignment pattern and output characteristics relating to the brightness of the object to be detected.

9. The misalignment correction method according to claim 6, wherein the reference color as a last color to be superposed on the image of the color other than the reference color is black.

10. The misalignment correction method according to claim 6, wherein the calculating comprises calculating an intersection point of two lines that represent a relationship between the optically detected values and corresponding misalignment quantities of the color other than the reference color as defined on a two-dimensional plane, and the determining comprises determining the misalignment quantity of the color other than the reference color with respect to the reference color based on the calculated intersection point.

11. The misalignment correction method according to claim 6, wherein the output signal corresponds to the optically detected values of the plurality of patches which are formed by superposing the reference color line image as a last color to be superposed on the line image of the color other than the reference color, the reference color being black.

* * * * *